US012566988B2

(12) United States Patent
Miano et al.

(10) Patent No.: US 12,566,988 B2
(45) Date of Patent: Mar. 3, 2026

(54) QUANTUM COMPUTING SYSTEMS WITH DIABATIC SINGLE FLUX QUANTUM (SFQ) READOUT FOR SUPERCONDUCTING QUANTUM BITS

(71) Applicant: SEEQC, INC., Elmsford, NY (US)

(72) Inventors: Alessandro Miano, Elmsford, NY (US); Oleg Mukhanov, Elmsford, NY (US)

(73) Assignee: SEEQC, INC., Elmsford, NY (US)

( * ) Notice: Subject to any disclaimer, the term of this patent is extended or adjusted under 35 U.S.C. 154(b) by 577 days.

(21) Appl. No.: 18/183,846

(22) Filed: Mar. 14, 2023

(65) Prior Publication Data

US 2024/0020562 A1     Jan. 18, 2024

Related U.S. Application Data

(63) Continuation of application No. PCT/US2021/050541, filed on Sep. 15, 2021.

(60) Provisional application No. 63/078,587, filed on Sep. 15, 2020.

(51) Int. Cl.
*G06N 10/20* (2022.01)
*G06N 10/40* (2022.01)

(52) U.S. Cl.
CPC ............. *G06N 10/20* (2022.01); *G06N 10/40* (2022.01)

(58) Field of Classification Search
CPC ................................ G06N 10/40; G06N 10/20
USPC .......................................................... 706/62
See application file for complete search history.

(56) References Cited

U.S. PATENT DOCUMENTS

| | | | |
|---|---|---|---|
| 9,425,804 B2 | 8/2016 | Mcdermott et al. | |
| 9,520,180 B1 | 12/2016 | Mukhanov | |
| 9,692,423 B2 | 6/2017 | Mcdermott et al. | |
| 9,761,547 B1 | 9/2017 | Kunkee | |
| 10,460,796 B1 | 10/2019 | Mukhanov | |
| 10,552,756 B2 | 2/2020 | Ipek | |
| 10,692,831 B1 | 6/2020 | Bronn | |

(Continued)

FOREIGN PATENT DOCUMENTS

| | | |
|---|---|---|
| CN | 110520873 A8 | 11/2019 |
| JP | 2012064622 A | 3/2012 |

(Continued)

OTHER PUBLICATIONS

Oleg A. Mukhanov, Energy-Efficient Single Flux Quantum Technology, 2011 (Year: 2011).*

(Continued)

*Primary Examiner* — Tarek Elchanti
(74) *Attorney, Agent, or Firm* — Perkins Coie LLP

(57) ABSTRACT

The technology disclosed in this patent document can be implemented to combine quantum computing and classical digital computing in a scalable computing system based on superconducting qubits using Josephson junctions that exhibit low dissipation long coherence times and can be fabricated with well-developed integrated circuit fabrication techniques. More specifically, the disclosed technology can be implemented by using two radio frequency (RF) superconducting quantum interference device (SQUID) circuits coupled in balance to preserve general symmetry and form a quantum readout circuit for reading and digitizing a superconducting qubit state with improved readout fidelity and sensitivity.

5 Claims, 13 Drawing Sheets

(56) References Cited

U.S. PATENT DOCUMENTS

| | | | |
|---|---|---|---|
| 10,726,351 | B1 | 7/2020 | Li et al. |
| 11,493,713 | B1 | 11/2022 | Mendoza |
| 11,525,878 | B1 | 12/2022 | Yoon |
| 2015/0263736 | A1 | 9/2015 | Herr et al. |
| 2016/0191060 | A1 | 6/2016 | Mcdermott et al. |
| 2016/0233860 | A1* | 8/2016 | Naaman ................. H03K 17/92 |
| 2017/0133336 | A1 | 5/2017 | Oliver |
| 2017/0179973 | A1* | 6/2017 | Bulzacchelli .......... G11C 27/02 |
| 2018/0013052 | A1 | 1/2018 | Oliver et al. |
| 2018/0285760 | A1 | 10/2018 | Abdo |
| 2019/0198199 | A1 | 6/2019 | Gundel |
| 2020/0012961 | A1 | 1/2020 | Kelly |
| 2020/0119251 | A1 | 4/2020 | Yohannes et al. |
| 2020/0250564 | A1 | 8/2020 | Li |
| 2020/0395651 | A1 | 12/2020 | Wilder |
| 2021/0280765 | A1 | 9/2021 | Huang |
| 2021/0350270 | A1 | 11/2021 | Jones |
| 2021/0357797 | A1 | 11/2021 | Karalekas |
| 2022/0156620 | A1 | 5/2022 | Mcdermott et al. |
| 2022/0237495 | A1 | 7/2022 | Yohannes et al. |
| 2023/0010205 | A1 | 1/2023 | Sank |
| 2023/0225225 | A1 | 7/2023 | Yang |

FOREIGN PATENT DOCUMENTS

| | | | |
|---|---|---|---|
| JP | 2020524281 | A | 8/2020 |
| JP | 2021501941 | A | 1/2021 |
| WO | 2004086295 | A1 | 10/2004 |
| WO | 2016138395 | A8 | 9/2016 |
| WO | 2020154745 | A1 | 7/2020 |
| WO | 2022060897 | A1 | 3/2022 |
| WO | 2022125186 | A2 | 6/2022 |

OTHER PUBLICATIONS

International Search Report and Written Opinion for International Patent Application No. PCT/US2021/050541, mailed Jan. 14, 2022 (17 pages).

Mukhanov, O., "Energy-Efficient Single Flux Quantum Technology," IEEE Transactions on Applied Superconductivity, 21(3), Jun. 2011.

Takeuchi, N. et al., "An adiabatic quantum flux parametron as an ultra-low-power logic device," Supercond. Sci. Technol., 26, 2013.

Acharya, R. et al., "Overcoming I/O bottleneck in superconducting quantum computing: multiplexed qubit control with ultra-low-power, base-temperature cryo-CMOS multiplexer." 2209.13060 (arxiv. org).

Bao, Z. et al., "A cryogenic on-chip microwave pulse generator for large-scale superconducting quantum computing." Nat Commun 15, 5958 (2024). https://doi.org/10.1038/s41467-024-50333-w.

Bardin, J.C. et al., "Design and Characterization of a 28nm Bulk-CMOS Cryogenic Quantum Controller Dissipating Less Than 2 mW at 3 K", IEEE J. Solid-St. Circuits, vol. 54, No. 11, Nov. 2019, 3043-3060.

Charbon et al., "Cryo-CMOS for Quantum Computing," IEEE, 2016, 4 pages.

Chen, O. et al., "Adiabatic Quantum-Flux-Parametron: Towards Building Extremely Energy-Efficient Circuits and Systems." Sci. Rep. 9, 10514 (2019).

First Office Action for CN Appl. No. 202180084432.3, mailed on Jun. 10, 2025, 42 pages with English translation.

Herr, Q.P. et al., "Ultra-low-power superconductor logic." J. Appl. Phys. 109, 103903 (2011).

Hironaka, T. et al., "Demonstration of Single-Flux-Quantum 64-B Lookup Table With Cryo-CMOS Decoders for Reconfiguration," IEEE Transactions on Applied Superconductivity, vol. 32, No. 8, pp. 1-5, Nov. 2022.

International Search Report and Written Opinion mailed Aug. 4, 2022 in International Patent Application No. PCT/US21/54828, 17 pages.

Leonard Jr. et al., "Digital Coherent Control of a Superconducting Qubit" Physical Review Applied 11, 014009 (2019), 13 pages.

Li, C.H. et al., "A 4 to 10 GHz 11-mW Cryogenic Driver Module Design for Quantum Computer Electronics and Optoelectronics," Syst. Research Laboratories, Ind. Tech. Research Inst., 2024, 4 pages.

Mariantoni, M. et al., "High-Density Qubit Wiring: Pin-Chip Bonding for Fully Vertical Interconnects", Quantum Physics, Oct. 22, 2018, 8 pages.

Mcdermott, R. et al., "Quantum-Classical Interface Based on Single Flux Quantum Digital Logic." Cornell University Library, Oct. 12, 2017, 16 pages.

Notice of Reasons for Refusal for JP Appl. No. 2023-541484, mailed on Jul. 9, 2025, 5 pages with English translation.

Office Action mailed Oct. 18, 2025 in Chinese Patent Application No. 202180076946.4, 18 pages, with English Translation.

Paik, H. et al., "Observation of High Coherence in Josephson Junction Qubits Measured in a Three-Dimensional Circuit QED Architecture." Physical Review Letters, 107(24), 240501 (2011).

Pauka, S.J. et al., "A cryogenic CMOS chip for generating control signals for multiple qubits." Nat Electron 4, 64-70 (2021). https://doi.org/10.1038/s41928-020-00528-y.

Wallraff, A., et al., "Strong coupling of a single photon to a superconducting qubit using circuit quantum electrodynamics." Nature, 431(7005, 162-167 (2004).

Yoshikawa, Nobuyuki, "Supconducting Digital Electronics for Controlling Quantum Computing Systems," IECE Trans. Electron., vol. E102-C, No. 3, Mar. 2019.

* cited by examiner

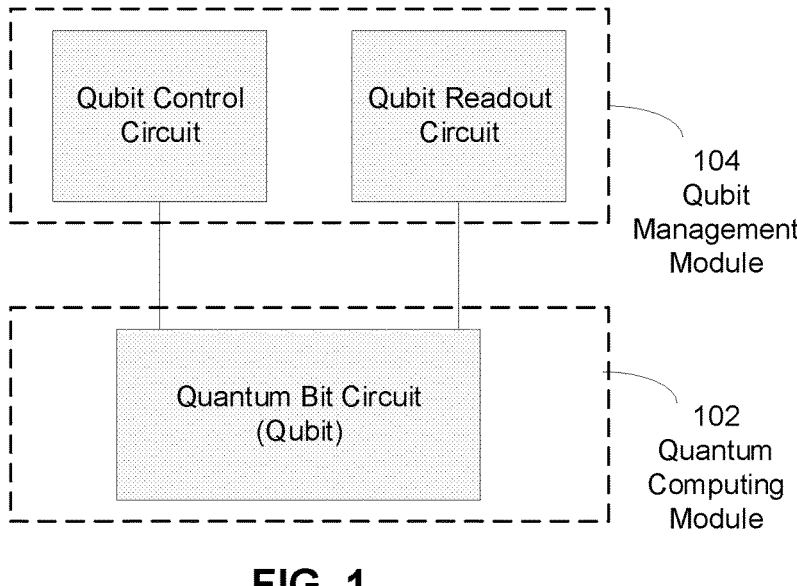
FIG. 1
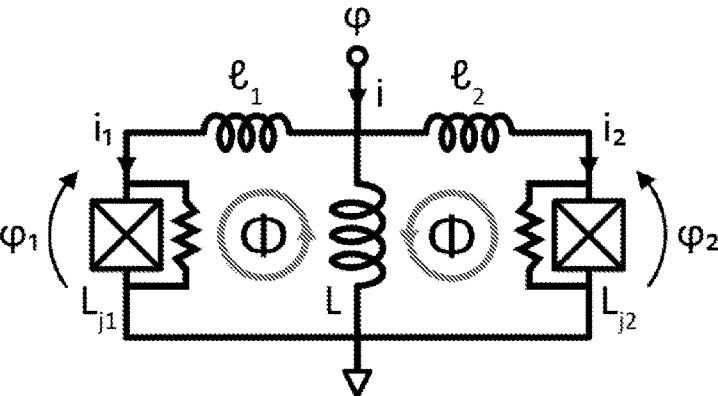
FIG. 2. Symmetric rf-SQUID. The device is made by two rf-SQUIDs sharing an inductance L. When the device is perfectly symmetrical under the following condition: $L_{j_1} = L_{j_2}$, $l_1 = l_2$.

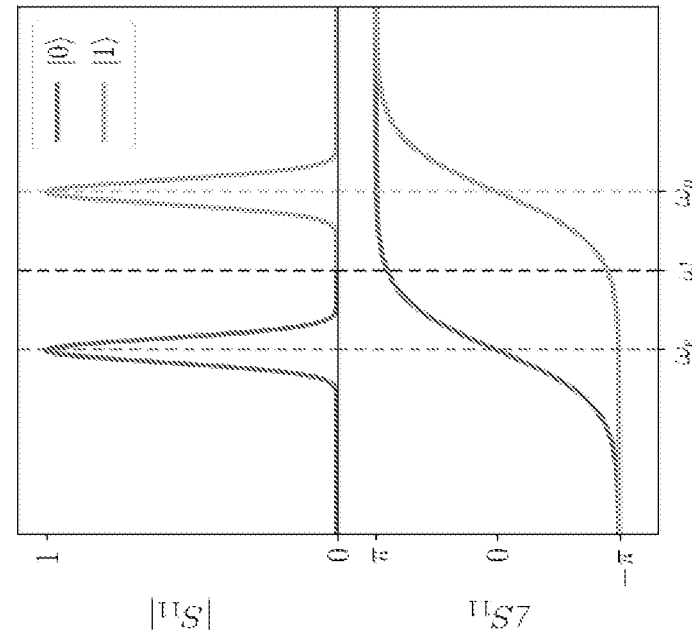
FIG. 3. In order to achieve phase-sensitive readout, a readout pulse is sent with a carrier frequency $\omega = (\omega_g + \omega_e)/2$, where $\omega_g$ and $\omega_e$ are, respectively, the frequencies of dressed resonator when the qubit is in the ground or excited state, 2nd conductor line
for receiving second bias current $i_2$ 2nd RF SQUID 2nd Josephson Junction $I_{C2}$ $i_2$ Common
inductor L 1st conductor line
for receiving first bias current $i_1$ from SFQ
Generator 1st RF SQUID $I_{C1}$ to SFQ
Comparator from qubit $i_1$ 1st Josephson Junction

QUANTUM COMPUTING SYSTEMS WITH DIABATIC SINGLE FLUX QUANTUM (SFQ) READOUT FOR SUPERCONDUCTING QUANTUM BITS

PRIORITY CLAIM AND RELATED PATENT APPLICATION

This patent document is a continuation of International Patent Application No. PCT/US2021/050541, filed Sep. 15, 2021, which claims priority to and benefits of U.S. U.S. Provisional Patent Application No. 63/078,587 entitled "QUANTUM COMPUTING SYSTEMS WITH DIABATIC SINGLE FLUX QUANTUM (SFQ) READOUT FOR SUPERCONDUCTING QUANTUM BITS" and filed on Sep. 15, 2020.

TECHNICAL FIELD

This patent document relates to computing or information processing systems including quantum computing modules performing information processing or computing using quantum states of quantum mechanical devices or circuits.

BACKGROUND

Classical digital computers, including general purpose digital computers and high-performance digital supercomputers, perform computations based on Boolean logic. Computing technologies based on Boolean logic have revolutionized a wide range of industries and technologies for recent decades but have also exhibited certain limitations in performing highly complex or large numbers of computations, such as molecular modeling of structures and properties of chemical compounds or biological structures, cryptography, or modeling of complex systems for weather forecast, climate changes and others. Various new computation techniques have been investigated to supplement or replace Boolean logic based digital computing.

Quantum-mechanical systems can be used to construct new computation systems for complex information processing. A quantum system suitable for quantum computing has an ensemble of subsystems exhibiting different quantum states where subsystems are correlated or "entangled" with one another due to quantum coherence, including long-range quantum coherence. In various implementations for quantum computers, each subsystem in the ensemble of subsystems may be a quantum system exhibiting two or more different quantum states to operate as a quantum bit ("qubit") and information can be represented, stored, processed, and transmitted by superposition and correlation of quantum states of different qubits. Some examples of implementations of qubits include superconducting qubits based on superconducting Josephson junctions developed at IBM, Google, Intel and others, ion trap devices based on electromagnetic trapping fields by laser beams developed at Honeywell and IonQ, semiconductor-based quantum dots and other devices capable of quantum computing operations.

SUMMARY

The technology disclosed in this patent document can be implemented to combine quantum computing and classical digital computing in a scalable computing system based on superconducting qubits using Josephson junctions that exhibit low dissipation long coherence times and can be fabricated with well-developed integrated circuit fabrication techniques. More specifically, the disclosed technology can be implemented by using two radio frequency (RF) superconducting quantum interference device (SQUID) circuits symmetrically coupled to form a quantum readout circuit for reading a superconducting qubit with improved read fidelity and sensitivity.

In one aspect, the disclosed technology can be implemented to provide a system capable of information processing based at least in part on quantum computing using quantum states of quantum bits. This system includes a quantum computing module comprising a plurality of quantum bit circuits, wherein each quantum bit circuit is structured as a superconducting circuit to exhibit different quantum states as a quantum bit and to quantum mechanically interact with other quantum bit circuits via quantum entanglement to cause superposition or correlation of different quantum states of the quantum bit circuits; and quantum bit readout circuits coupled to and in communications with the quantum bit circuits, respectively. Each quantum bit readout circuit includes, an inductor and two radio frequency (RF) superconducting quantum interference device (SQUID) circuits symmetrically coupled to the inductor to form a phase sensitive detector that is operable to measure a phase of a signal. Each quantum bit readout circuit is instructed to generate a read signal at a signal frequency between resonant frequencies associated with excited and ground states of a corresponding quantum bit circuit, respectively, and to detect a phase of a reflected signal of the read signal from the corresponding quantum bit circuit to indicate a quantum state of the corresponding quantum bit circuit based on the detected phase.

In another aspect, the disclosed technology can be implemented to provide a method for preforming information processing based at least in part on quantum computing using quantum states of quantum bits. This method includes operating a quantum computing module comprising a plurality of superconducting quantum bit circuits so that each quantum bit circuit exhibits different quantum states as a quantum bit and to quantum mechanically interact with other quantum bit circuits to cause superposition or correlation of different quantum states of the quantum bit circuits; and operating quantum bit readout circuits to interact with the quantum bit circuits, respectively, to readout information about the quantum bit circuits. In this method, each quantum bit readout circuit includes an inductor and two radio frequency (RF) superconducting quantum interference device (SQUID) circuits that are coupled to the inductor to form a phase sensitive detector that is operable to measure a phase of a signal and each quantum bit readout circuit is instructed to generate a read signal at a signal frequency between resonant frequencies associated with excited and ground states of a corresponding quantum bit circuit, respectively, and to detect a phase of a reflected signal of the read signal from the corresponding quantum bit circuit to indicate a quantum state of the corresponding quantum bit circuit based on the detected phase.

In yet another aspect, the disclosed technology can be implemented to provide system capable of information processing based at least in part on quantum computing using quantum states of quantum bits. This system includes a cryostat system structured to include different cryogenic stages operable to provide a low cryogenic temperature and higher cryogenic temperatures and a quantum computing module enclosed by the cryostat system at the low cryogenic temperature. The quantum computing module comprises a first integrated chip structured to support a plurality of quantum bit circuits, wherein each quantum bit circuit is structured as a superconducting circuit at the low cryogenic temperature to exhibit different quantum states as a quantum-mechanical system and to quantum-mechanically interact with other quantum bit circuits via quantum entanglement to cause superposition or correlation of different quantum states of the quantum bit circuits. This system includes a quantum bit management circuit module enclosed by the cryostat system, located adjacent to the quantum computing module and coupled to be maintained at a cryogenic temperature, quantum bit control circuits supported by the second integrated chip and structured to direct control signals to the quantum bit circuits to control the quantum bit circuits, respectively, and quantum bit readout circuits supported by the second integrated chip and structured to output readout signals from the quantum bit circuits, respectively. The readout signals represent quantum states of the quantum bit circuits, respectively, and the quantum bit control circuits and quantum bit readout circuits are structured to include superconducting circuits at the low cryogenic temperature and operable to operate with the control signals and readout signals based on digital processing and in a non-quantum classical manner. The second integrated chip is engaged to the first integrated chip to form a multichip module to transfer control signals and readout signals therebetween, wherein each quantum bit readout circuit includes (1) an inductor, (2) two radio frequency (RF) superconducting quantum interference device (SQUID) circuits coupled to the inductor to form a phase sensitive detector that is operable to measure a phase of a signal, and (3) a bias circuit coupled to the two RF SQUID circuits to bias either one or both of the two RF SQUID circuits to reduce a difference in currents in the two RF SQUID circuits. This system further includes circuit modules enclosed by the cryostat system at the higher cryogenic temperatures and structured to communicate with the quantum bit management circuit module in connection with the control signals and readout signals; electrically conductive bumps formed to connect the first and second integrated chips, at least part of which form electrical conductive paths between the quantum bit management circuit module and quantum computing module for transfer of part of the control signals and readout signals without using other wiring between the quantum bit management circuit module and quantum computing module; and electrically conductive wires coupled between the quantum bit management circuit module and at least one of the circuit modules situated at higher temperature stages of the cryostat system to provide communications and transfer signals therebetween.

The above and other aspects, and their implementations are described in greater detail in the drawings, the description and the claims.

BRIEF DESCRIPTION OF DRAWINGS

FIG. 1 shows a part of an example of a quantum computing system.

FIG. 2 shows an example of a symmetric radio frequency (RF) superconducting quantum interference device (SQUID) as the qubit readout circuit in FIG. 1.

FIGS. 3, 4, 5A, 5B, 5C, 6A, 6B, 6C, 7A, 7B, 7C, 7D and 7E show examples and their features or properties in implementing the design in FIG. 2.

DETAILED DESCRIPTION

Figure 4:
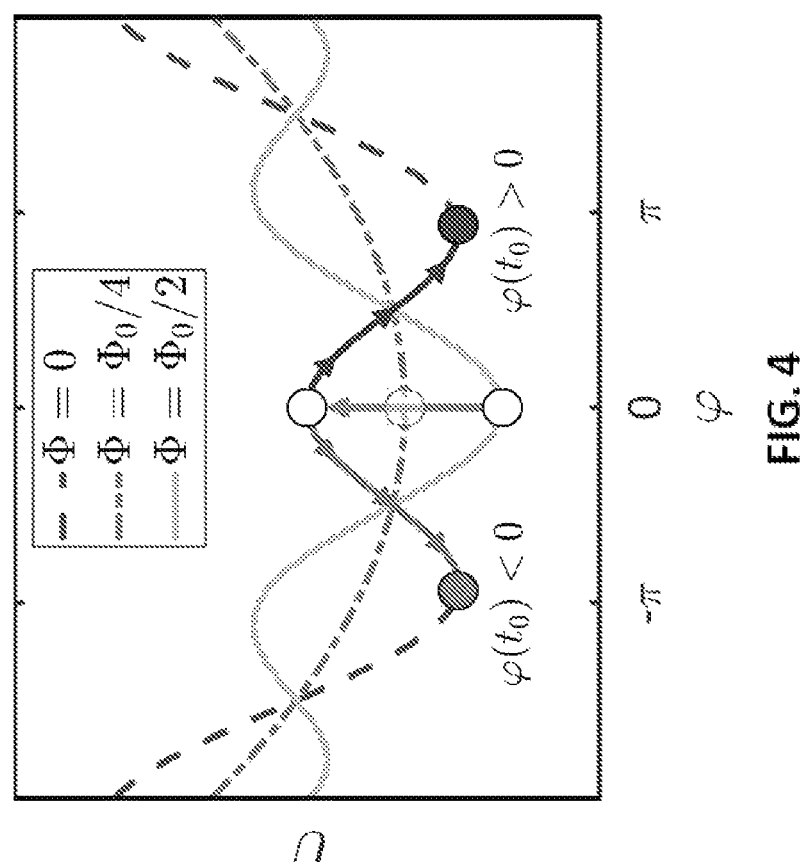

The technology disclosed herein for computing or information processing systems uses superconductor-based quantum computing modules (e.g., superconducting Josephson junctions) to construct quantum computing modules or devices and classical digital computing modules or devices for various applications based on quantum computing. Such a quantum system can include an ensemble of qubits based on superconducting Josephson junctions to perform complex computations based on the superposition and correlation/entanglement of quantum states of qubits. A qubit device can be controlled by a qubit control circuit and a qubit readout circuit can be used to measure the quantum state of the qubit device under the control by the qubit control circuit and to provide readout of the qubit based on the measurement.

FIG. 1 shows a portion of an example of a quantum computing system that operates superconducting qubit circuits or devices as part of a quantum computing module 102 for performing quantum computations. A qubit management circuit module 104 is provided and is in communications with the quantum computing module 102. The qubit management module 104 includes qubit control circuits to provide control signals to the individual qubit circuits of the quantum computing module 102 and qubit readout circuits to read out the individual qubit circuits implemented by using non-quantum mechanical processing circuitry such as digital circuitry or analogy circuitry or a combination of digital and analog circuitry. More specifically, FIG. 1 illustrates a pair of qubit control and readout circuits for one qubit circuit as an example and the qubit management circuit module 104 and the quantum computing module 102 include multiple pairs of qubit control and readout circuits to form multiple qubit circuits.

In FIG. 1, the qubit control circuits of the qubit management module 104 can be structured in different configurations. For example, one well-known technique for controlling qubits is to direct a low-energy analog microwave signal to cause selective excitation of individual transitions between quantum states of a qubit device. The hardware for generating and directing such an analog microwave signal to a qubit in various implementations may require complex circuitry and complex wiring for generating and transmitting the analog microwave signal through cryogenic equipment. In addition, the analog microwave signal is subject to interference and noise and thus additional signal conditioning and filtering are needed in qubit control circuits. Those and other aspects of the qubit control based on analog microwave signals present a challenge for complex quantum computing systems having a large numbers of qubits. As another example for controlling qubits, single flux quantum (SFQ) logic circuits based on superconducting Josephson junctions can be used to generate resonant digital voltage SFQ pulses or pulse sequences to coherently control qubits. For example, U.S. Pat. No. 9,425,804B2 entitled "System and method for controlling superconducting quantum circuits using single flux quantum logic circuits" and issued to Wisconsin Alumni Research Foundation discloses controlling superconducting quantum circuits by using a SFQ control circuit to generate a voltage pulse sequence of voltage pulses temporally separated by a pulse-to-pulse spacing timed to a resonance period so that the SFQ pulses are in resonance with the frequency of the qubit. The pulse widths of SFQ pulses are set to be much less than the oscillation or resonance periods of the qubits, each qubit is insensitive to the detailed shape of an individual SFQ pulse, and the qubit response is a function of the time integral of the SFQ pulse. Other circuit designs based on SFQ technology and other techniques may also be used to construct qubit control circuits of the qubit management module 104.

The qubit readout circuits in FIG. 1 can be implemented based on different designs to achieve accurate measurements of the quantum states of a qubit without destroying the quantum states, i.e., quantum nondemolition ("QND") measurements of the qubit. For example, a qubit readout circuit can be built based on a Josephson photomultiplier (JPM) to direct a readout tone or signal of a qubit in resonance with the |1> state of the qubit. Then, the readout pulse is scattered from the qubit that encodes its state into the amplitude of the readout pulse to produce a dressed pulse. This dressed pulse interacts with the JPM, that will undergo a phase slip only if the qubit was in |1>, i.e. the input pulse will be strong enough. One example of this JPM readout implementation is described in U.S. Pat. No. 9,692,423 entitled "System and method for circuit quantum electrodynamics measurement" and issued to Universitaet des Saarlandes (Germany), Syracuse University and Wisconsin Alumni Research Foundation.

For another example, a suitable qubit readout circuit for implementing quantum computing systems based on the technology disclosed in this document can include a symmetric radio frequency (RF) superconducting quantum interference device (SQUID) with one superconducting loop and a single Josephson Junction in the superconducting loop. The Josephson Junction includes a thin non-superconducting layer (e.g., an insulating barrier) sandwiched between two superconductors such that electrons can tunnel through the barrier. The disclosed symmetric RF SQUID readout circuit may be coupled directly to a qubit for readout (e.g., a transmission line of the qubit) or to a resonant cavity coupled to the qubit for readout such that a quantum state information of the qubit circuit is transferred to a resonant cavity occupation or read out directly. A single flux quantum (SFQ) circuit may be coupled to the symmetric RF SQUID readout circuit and configured to time RF readout circuit and receive the readout signal.

FIG. 2 shows an example of the symmetric RF SQUID readout circuit with two RF SQUIDs coupled to share a common inductor L. The two RF SQUIDs should be substantially identical but practical fabrication often render them non-identical. Each RF SQUID includes one superconducting Josephson junction in a closed superconducting loop or ring and the magnetic flux of the loop or ring can be measured with high accuracy. This readout circuit operates based on the interaction with the phase of the pulse reflected from the qubit under measurement and can have different potential shapes depending on the external flux $\Phi_0$ at the two closed superconducting loops of the symmetric RF SQUID readout circuit.

FIG. 3 shows the spectral diagram of the symmetric RF SQUID readout circuit in FIG. 2 in readout operations. In order to have a scattered signal sensitive to the phase, the readout signal frequency is tuned to a frequency between the resonant frequencies $\omega_e$ and $\omega_g$ for the excited state |1> and ground state |0> and, in some implementations, this readout signal frequency may be at the middle point between the two resonant frequencies $\Omega_e$ and $\omega_g$.

This symmetric RF SQUID readout circuit, if homogeneously flux-biased, can be operated using fast SFQ pulses to diabatically change the potential shape without directly generating a backaction pulse due to the symmetry of the device. The "diabatic" term comes from the fact that the symmetric RF SQUID is driven with a SFQ pulse that is much shorter in pulse duration than the pulse duration of a typical microwave readout pulse. In various implementations, such a readout pulse is typically between 1-10 GHz (1000 to 100 ps of period), while a SFQ pulse can be easily generated with a pulse duration less than 10 ps, and is approximately 1 to 2 orders of magnitude shorter than the period of a single readout pulse.

In some implementations of the disclosed technology, the spectrum of the symmetric RF SQUID can be designed to have frequencies much higher than the frequency of the qubit. In this way, the whole evolution of the phase of the RF SQUID will generate backaction photons (indirect backaction, opposed to direct backaction) that will not be able to reach the qubit having frequencies outside the absorbance spectrum of the qubit and the resonator. These photons will eventually be dissipated on the shunt resistances of the Josephson Junctions in the symmetric RF SQUID (FIG. 2)

In operation, the symmetric RF SQUID in FIG. 2 is biased with SFQ pulses, in order to "digitally" control the shape of the potential. Referring to the potential as a function of the phase in FIG. 4, when a flip of the potential is provided at the time $t_0$, depending on the sign of the initial condition on the phase $\varphi(t_0)$, the phase particle will fall either to the left or the right of the potential peak and, consequently, the current flowing into inductance L can be in either directions. This direction dependence of the current is used as the readout mechanism of the symmetric RF SQUID in FIG. 2: by sending a phase sensitive readout pulse into the symmetric RF SQUID, two different initial conditions to phase $\varphi$ exist depending on the phase of the readout tone. Accordingly, the coupling between the two symmetric RF SQUID circuits and the inductor form a phase sensitive detector that is operable to measure a phase of the reflected signal from the qubit that carries the information on the quantum state of the qubit.

Figures 5A, 5B, 5C:
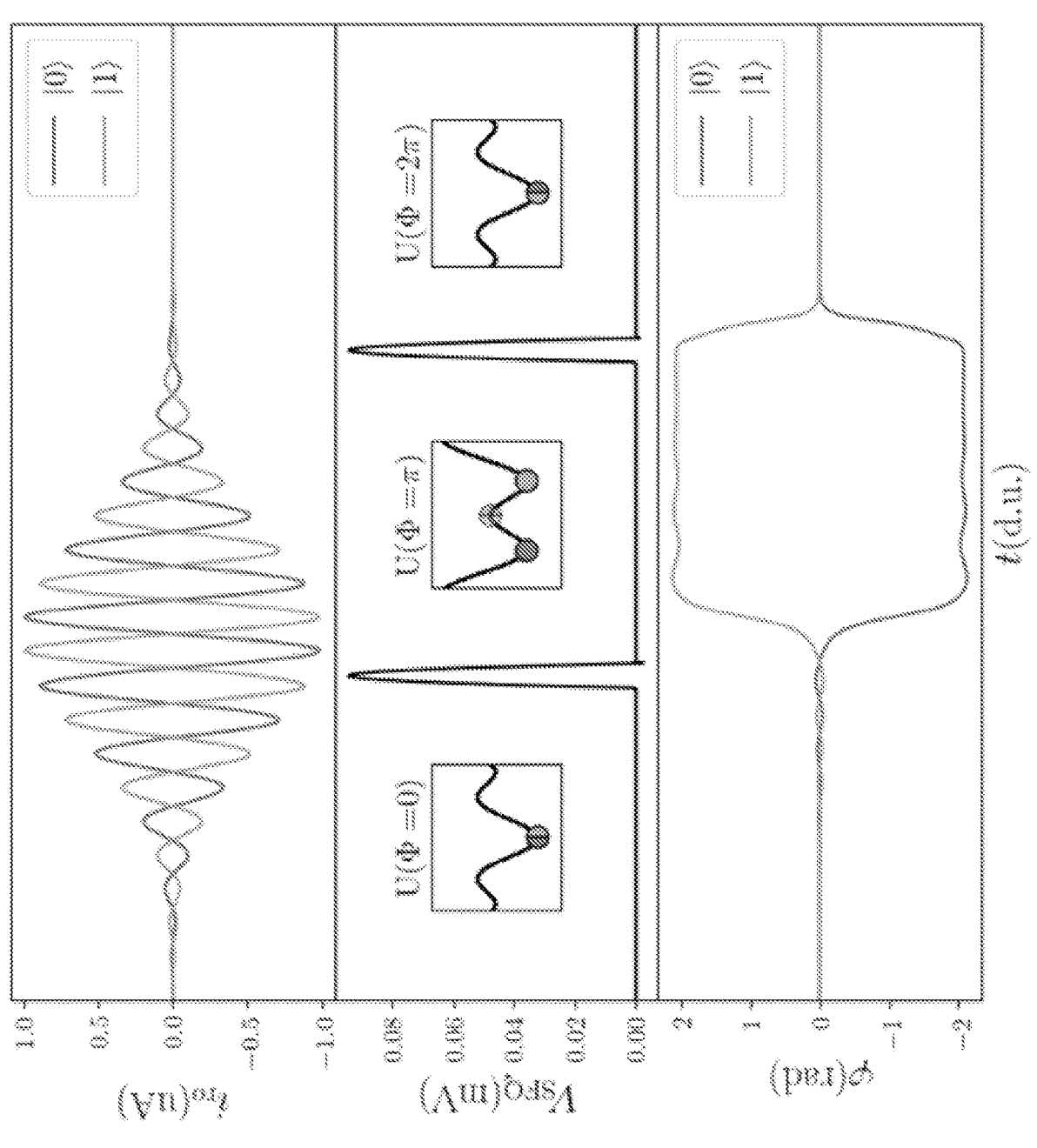

Simulation of the operations of the symmetric RF SQUID readout circuit in FIG. 2 was performed by using the PSCAN2 superconductor circuit simulator and the simulation results are shown in FIGS. 5A, 5B and 5C. FIG. 5A shows that a readout pulse is sent to the qubit at a frequency $\omega=(\omega_g+\Omega_e)/2$ such that the phase of the reflected pulse will depend on the quantum state of the qubit. The reflected pulse from the qubit (or the resonant cavity coupled to the qubit), then, injects a current in the symmetric RF SQUID readout circuit whose phase will start to oscillate depending on the qubit state as shown in FIG. 5B. Note that, if the plasma frequency of the device is much greater than $\omega$, then $\varphi(t)$ oscillations will be in-phase with the input current (inductive behavior), as shown in FIG. 5C.

A signal generated by a SFQ controller provides a $\Phi_0/2$ flux bias to the symmetric RF SQUID readout circuit, changing diabatically (and without backaction) the shape of the potential. At this point the phase particle will have, with respect to the $\varphi=0$ state, a positive or negative offset and consequently fall in either the left well or the right well next to the potential peak. The current flowing into the central inductor L of the symmetric RF SQUID readout circuit will then have a direction that depends on the qubit state, and via flux transformer the current is fed in a SFQ comparator for processing and memorization.

The above symmetric RF SQUID readout circuit may be constructed to achieve one or more advantages. For example, the undesired backaction of the symmetric RF SQUID readout circuit is state-independent and can be reduced for both states at the same time. For example, different from the aforementioned JPM readout design, this symmetric RF SQUID readout circuit does not require to be on-resonance with the qubit itself to properly work. As a result, the spectrum of the potential after the switching can be far from resonance with the qubit and thus avoids a precise control of flux on a short time interval for the resonance condition. For another example, different from the aforementioned JPM readout design which requires complex preparation of the JPM readout circuit to reduce backaction photons, the above symmetric RF SQUID readout circuit requires no tricky preparation of the device before readout and can start with, for example, the ground state with no flux applied. For another example, the symmetry of the above symmetric RF SQUID readout circuit allows the qubit readout to be triggered with a sharp SFQ pulse without any backaction, allowing very fast operation without increasing backaction with respect to the JPM. As yet another example, this symmetric RF SQUID readout circuit is phase sensitive and can be used for measuring very low power signals (the readout pulse doesn't need to excite anything, just provide a phase shift to phase particle).

The above symmetric RF SQUID readout circuit can also be used to take advantage of additional features. For example, the device can be operated to compensate or reduce noise by performing multiple measurements on the same readout pulse and the readout can be based on the average of the multiple measurements to reduce the noise. For another example, the readout pulse can be made as a microwave pulse generated by a CMOS circuit or superconducting on-chip clock source which may be, in some implementations, located on a separate cryogenic chip (e.g., the qubit management module 104 in FIG. 1) coupled to the qubit chip (i.e., the quantum computing module 102 in FIG. 1). In addition, the readout pulse can also be made by SFQ pulses, as phase response can be sensitive to variation of phase of non sinusoidal signals.

Notably, a deviation from the symmetry of the two Josephson junctions $I_{C1}$ and $I_{C2}$ of the symmetric RF SQUID readout circuit may significantly impact the performance of the readout operations. Such undesired asymmetry of the two RF SQUID devices can be caused by various factors. For example, in fabricating actual devices, there may be some differences in the physical circuit components of the two RF SQUID devices that are intended to be identical and symmetric in their properties by design for this symmetric RF SQUID readout circuit. Such differences may be caused by inevitable variations in the physical making of those circuit components due to practical limitations in the fabrication equipment or processes. As a result, the final fabricated two RF SQUIDs may be different from each other in one or more aspects, such as different critical currents, and therefore cause asymmetry in the circuit that can degrade the desired behavior of ideally symmetric RF SQUID readout circuit. Undesired RF SQUID asymmetric properties of the two RF SQUIDs may be reduced by implementing bias or compensation circuitry in practical devices.

Figure 6A:
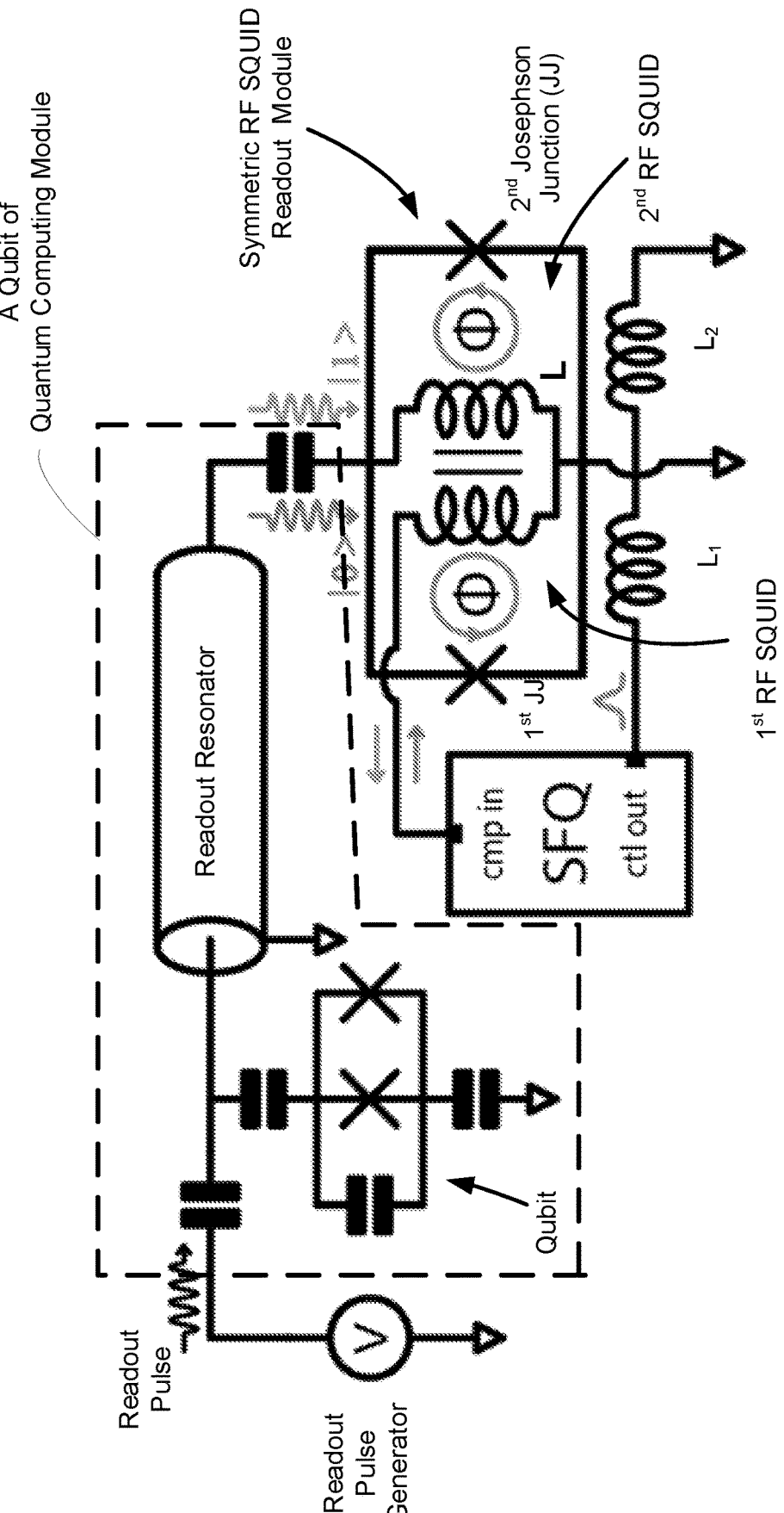

For example, in some designs, undesired asymmetric critical currents can be compensated by application of an input current as an asymmetrical DC flux bias) to offset the differences in the currents in the two RF SQUIDs on two sides of the shared common inductor L to ensure the desired operation. FIG. 6A shows an example of a SFQ bias circuit coupled to the symmetric RF SQUID readout circuit in FIG. 2 to equalize the undesired asymmetric critical currents in the two RF SQUIDs. A readout pulse generator is coupled to a qubit to send a readout pulse to the qubit and a readout resonator is coupled to the qubit to direct the readout pulse from the qubit to the symmetric RF SQUID readout circuit. In this example, the qubit and the readout resonator form a basic qubit unit and many such basic qubit units form a quantum computing module as part of the quantum processor or chip shown in FIGS. 1 and 8A-8C and the symmetric RF SQUID readout circuit is part of the quantum bit management circuit module shown in FIGS. 1 and 8A-8C. The SFQ bias circuit provides a SFQ flux bias to digitally change the potential shape by a control output to two inductors $L_1$ and $L_2$ that are connected to the SFQ bias circuit to model the magnetic coupling to the two loops forming the symmetric RF SQUID. These two inductors $L_1$ and $L_2$ can be operated together with the same SFQ bias circuit coupled to them as shown in FIG. 6A. The SFQ bias circuit is coupled to at least one of the two coupled inductors $L_1$ and $L_2$ to adjust the current so that the two currents in the two RF SQUIDs are substantially or nearly symmetric. Alternatively, these two inductors $L_1$ and $L_2$ can be coupled to two independent SFQ bias circuits, respectively, one SFQ bias circuit per inductor, to compensate for asymmetries in the critical currents of the junctions. As shown, the SFQ bias circuit is also coupled to detect or read the sign of the current in the common inductor L of the symmetric RF-SQUID and this sign depends on the quantum non-demolition (QND) measurement of the qubit.

Figure 6B:
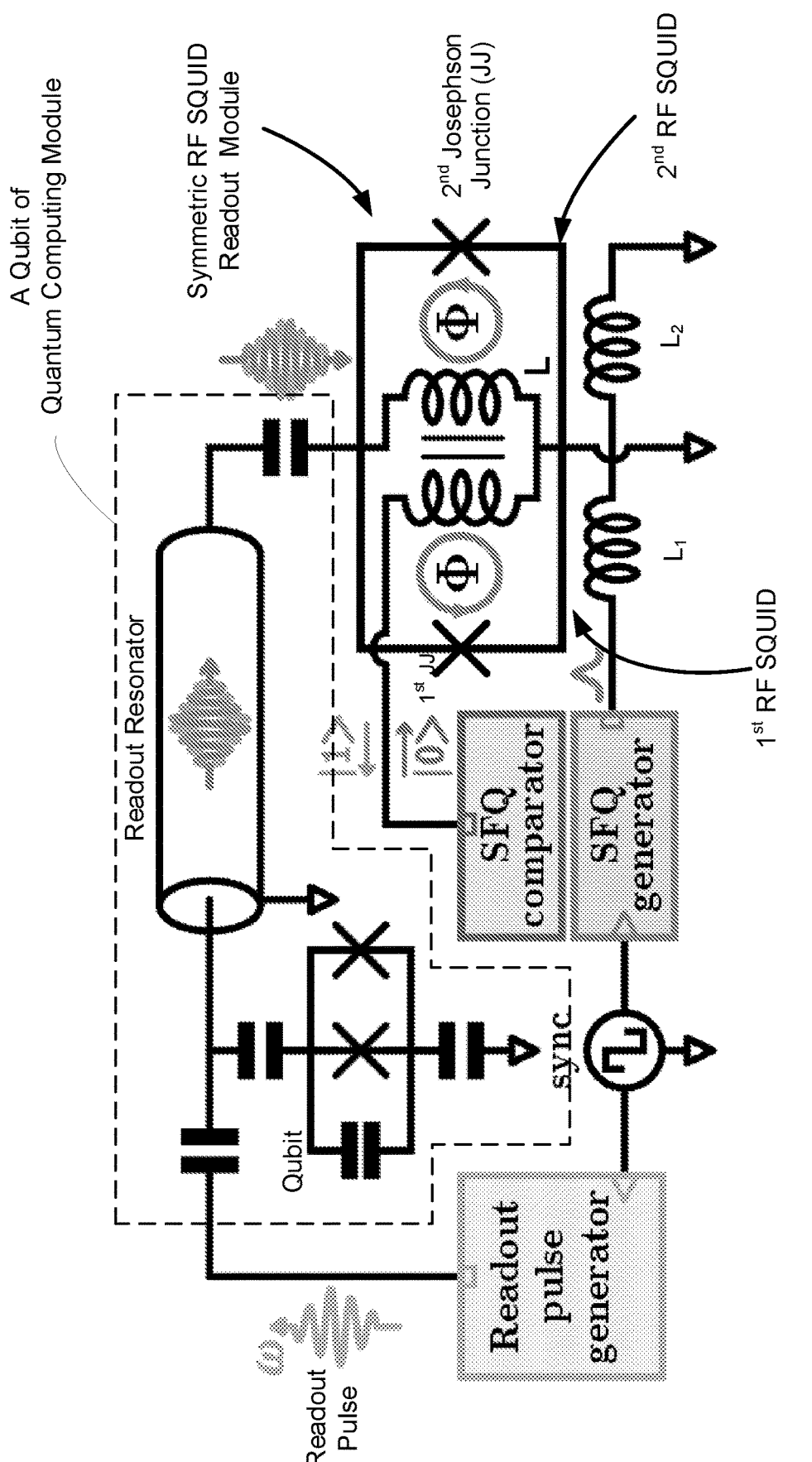

FIG. 6B shows additional implementation details of the design of FIG. 6A, where the SFQ bias circuit is explicitly formed by two subcircuits: SFQ generator and SFQ comparator. The SFQ generator provides a SFQ bias to the two inductors $L_1$ and $L_2$ coupled to the Symmetric RF-SQUID. In implementations, this SFQ generator can be implemented as two separate SFQ generators to separately drive the two inductors $L_1$ and $L_2$, respectively, one SFQ bias circuit per inductor. In this example, the SFQ generator is also synced to the Readout Pulse Generator in order to provide correct timing to the SFQ bias pulse(s) and change the potential shape at the right moment. As shown, the readout pulse generator produces a readout pulse to the qubit for the readout operation.

The SFQ comparator in FIG. 6B of the SFQ bias circuit is provided to read the sign of the current in the common inductor L of the Symmetric RF-SQUID, whose sign depends on the quantum non-demolition (QND) measurement of the qubit.

Figure 6C:
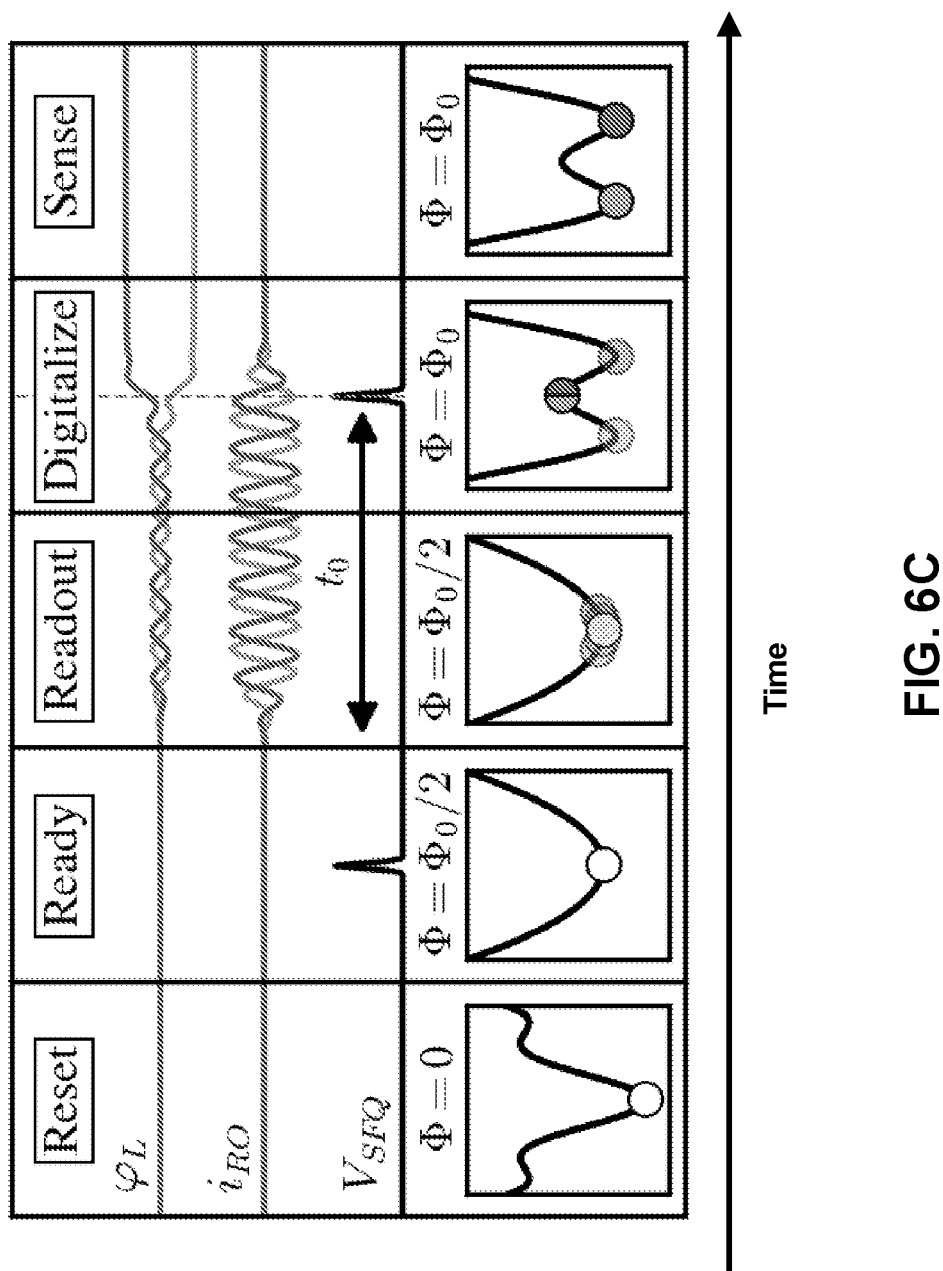

FIG. 6C shows a single measurement on the qubit over different stages in time. In this measurement, the potential starts from the RESET condition, with zero applied flux. Next, the potential of the symmetric RF SQUID is prepared (READY) to a harmonic configuration to start from an impedance condition that will maximize the current flowing into the common inductor of the Symmetric RF SQUID from the readout pulse. The READOUT pulse is sent to the qubit and eventually arrives to the Symmetric RF-SQUID, making the phase particle start to oscillate accordingly to the phase of the Readout Pulse that encodes the qubit measurement outcome. The Potential of the Symmetric RF SQUID is changed after a time t0 from the readout pulse start, and then the phase particle falls on either left or right well. This process effectively digitalizes (DIGITALIZE) the qubit measurement outcome. The position of the phase particle is sensed by the SFQ Comparator subcircuit. The protocol can then restart again directly from the harmonic case.

Figure 7A:
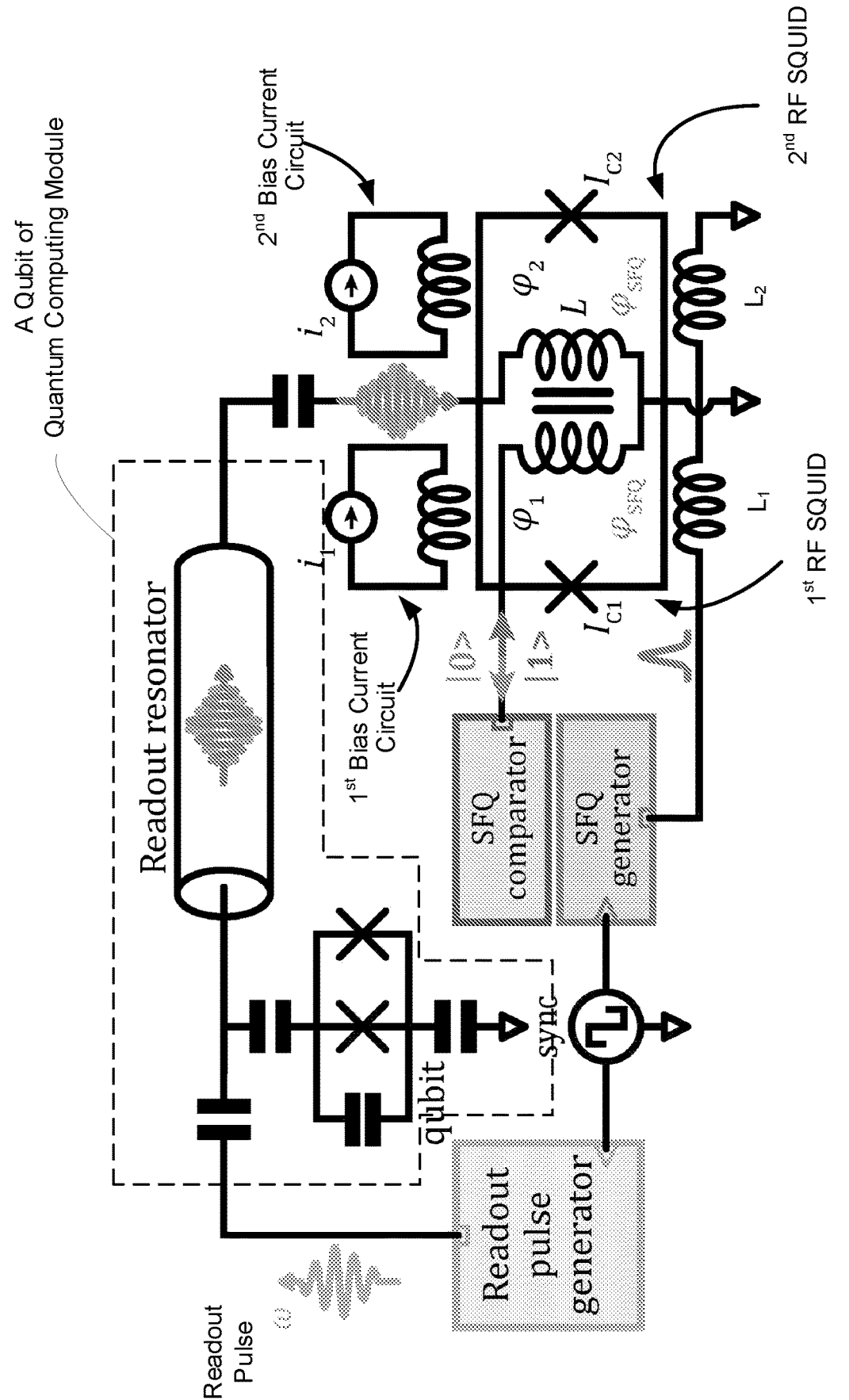
Figure 7B:
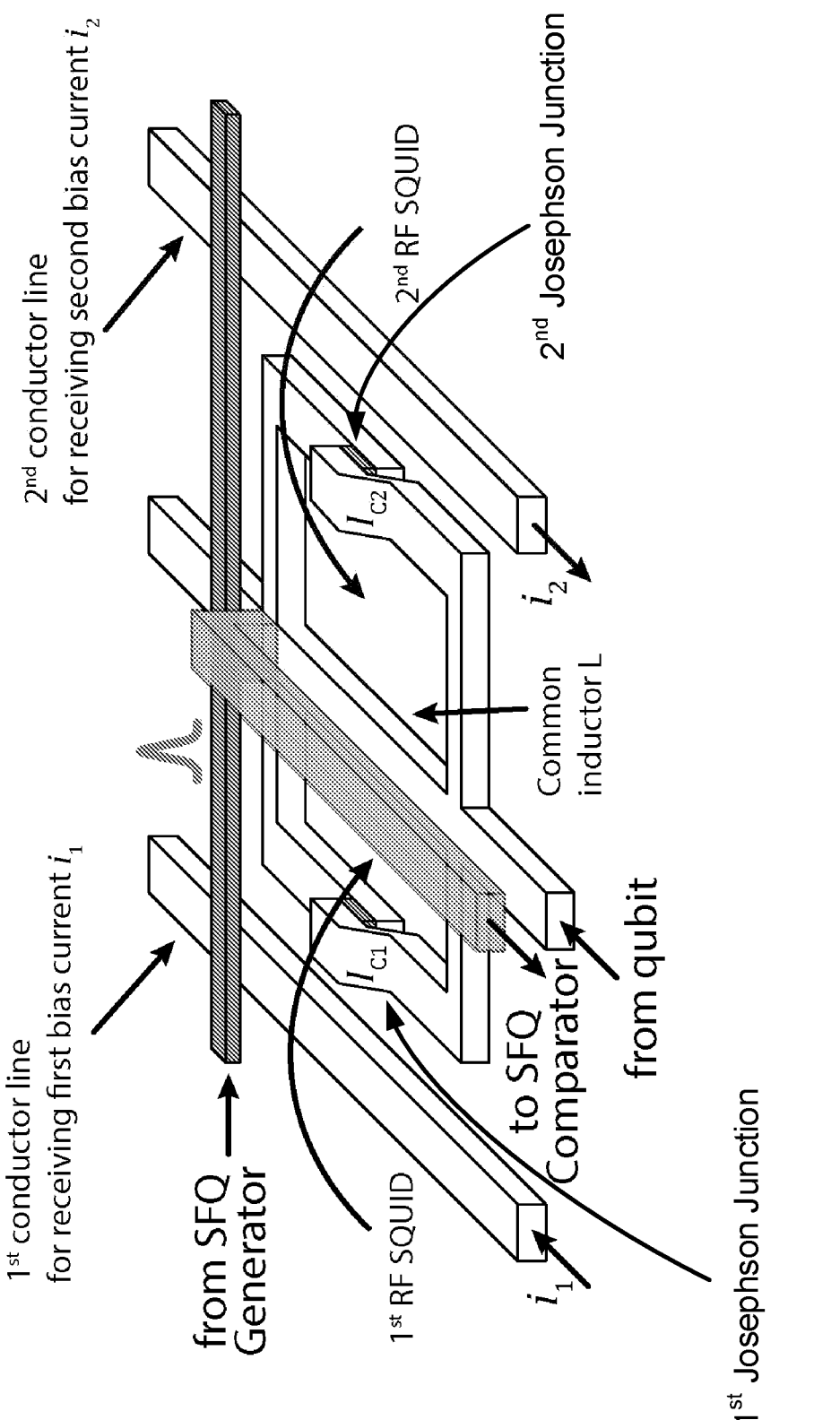

FIG. 7A shows an example of another design of an RF SQUID readout circuit with two RF SQUIDs and two independently adjustable bias current circuits to reduce the asymmetry between the two RF SQUIDs in actual devices based on the symmetry design in FIG. 2. FIG. 7B shows an example of a conceptual layout of physical components of the demonstrating how these two biases can be coupled to the loops of the two RF SQUIDs of the symmetric RF SQUID, respectively. Two independently adjustable DC bias circuits may be implemented by including two independent DC current generators $i_1$ and $i_2$ that are coupled to the two RF SQUID devices to apply two DC fluxes $\varphi_1$ and $\varphi_2$, respectively, to bias the RF SQUID readout circuit at a desired operating point that can compensate for the asymmetry between the two RFSQUID devices. If it is assumed that $I_C$ is the nominal desired value of the critical current of the two RF SQUID devices that exhibits actual critical currents at $I_{C1}$ and $I_{C2}$. Therefore, $\Delta I_C = I_{C1} - I_{C2}$ represents the difference in their respective critical currents, accounting for asymmetry due to fabrication or other factors in a practical device. The corresponding flux biases provided by two independent DC current generators $i_1$ and $i_2$. are $\varphi_1$ and $\varphi_2$, respectively. These magnetic flux biases can be used to prepare the circuit in the optimal "ready" configuration as shown in FIG. 6C.

Considering an asymmetry of critical currents $\Delta I_C / I_C = \pm 10\%$, PSCAN2 circuit simulations can be used to find the combinations of DC fluxes $\varphi_1$ and $\varphi_2$ that reduces the circuit behavior of the undesired asymmetry of the circuits to achieve or approach the desired behavior of the readout system. Our simulation results are shown in FIGS. 7C and 7D.

Figures 7C, 7D, 7E:
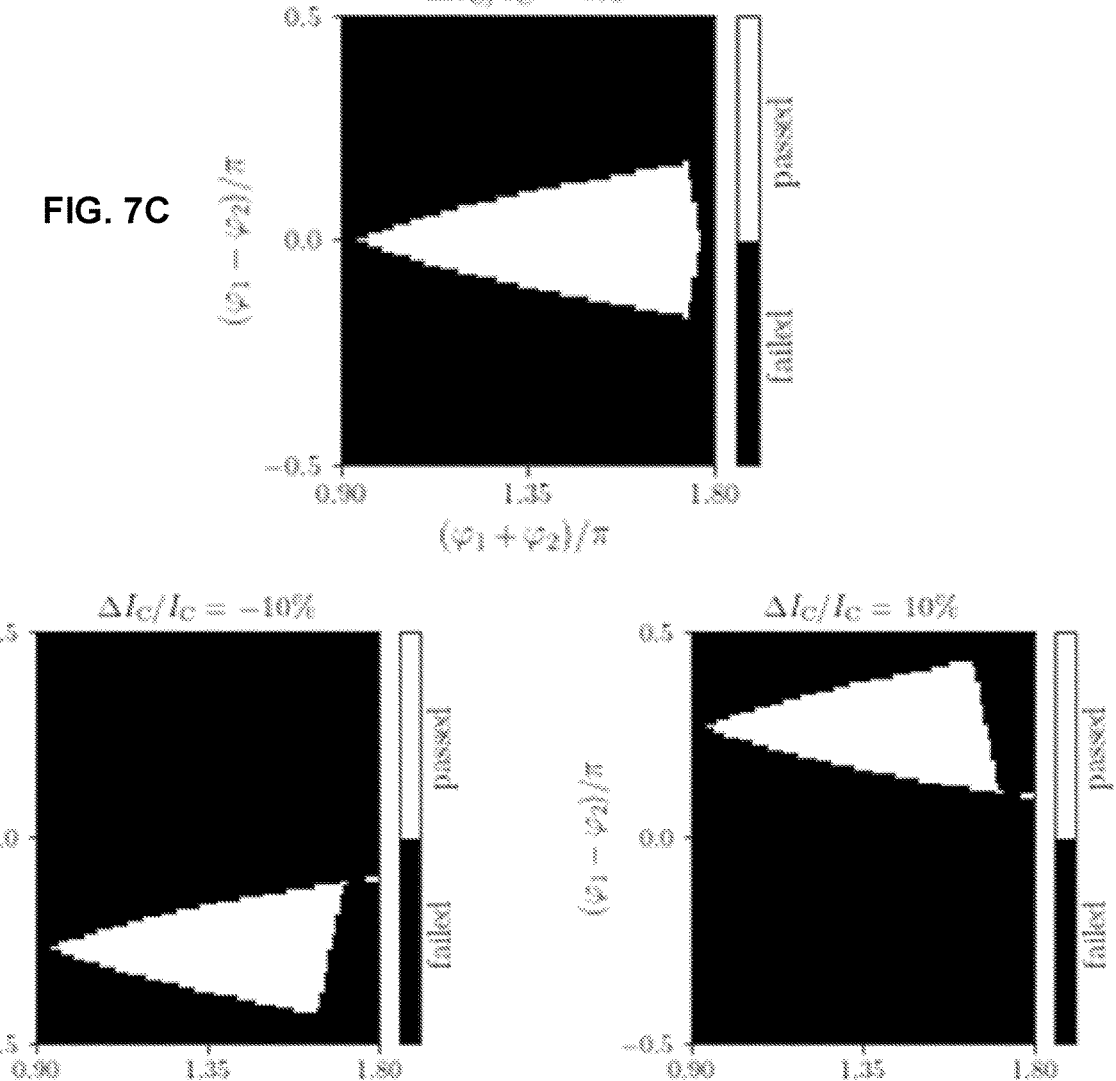

FIG. 7C shows the simulation for $\Delta I_C / I_C = 0\%$ where the region of DC flux biases for the device in FIG. 7A to operate properly. is marked in the yellow color. With perfectly identical junctions, the region of fluxes where the device works as intended (yellow) is symmetrical with respect to the vertical axes so that there is no need for apply a DC bias, i.e., the value for $(\varphi_1 - \varphi_2)/\pi$ is zero.

FIGS. 7D and 7E show similarly designed devices based on FIG. 2 that exhibit critical current differences of $\Delta I_C / I_C = \pm 10\%$ respectively. With non-identical junctions a shown in FIG. 7C with a difference of $-10\%$ and in FIG. 7E with a difference of $+10\%$, the regions of fluxes where the devices work as intended (yellow) are asymmetrical. Now it is possible to see how a difference between the two junctions can be compensated by applying a differential flux bias $(\varphi_1 - \varphi_2)/\pi$ with appropriate sign and value in order to recover the optimal DC bias point that ensures a correct operation of the readout device.

Figure 8A:
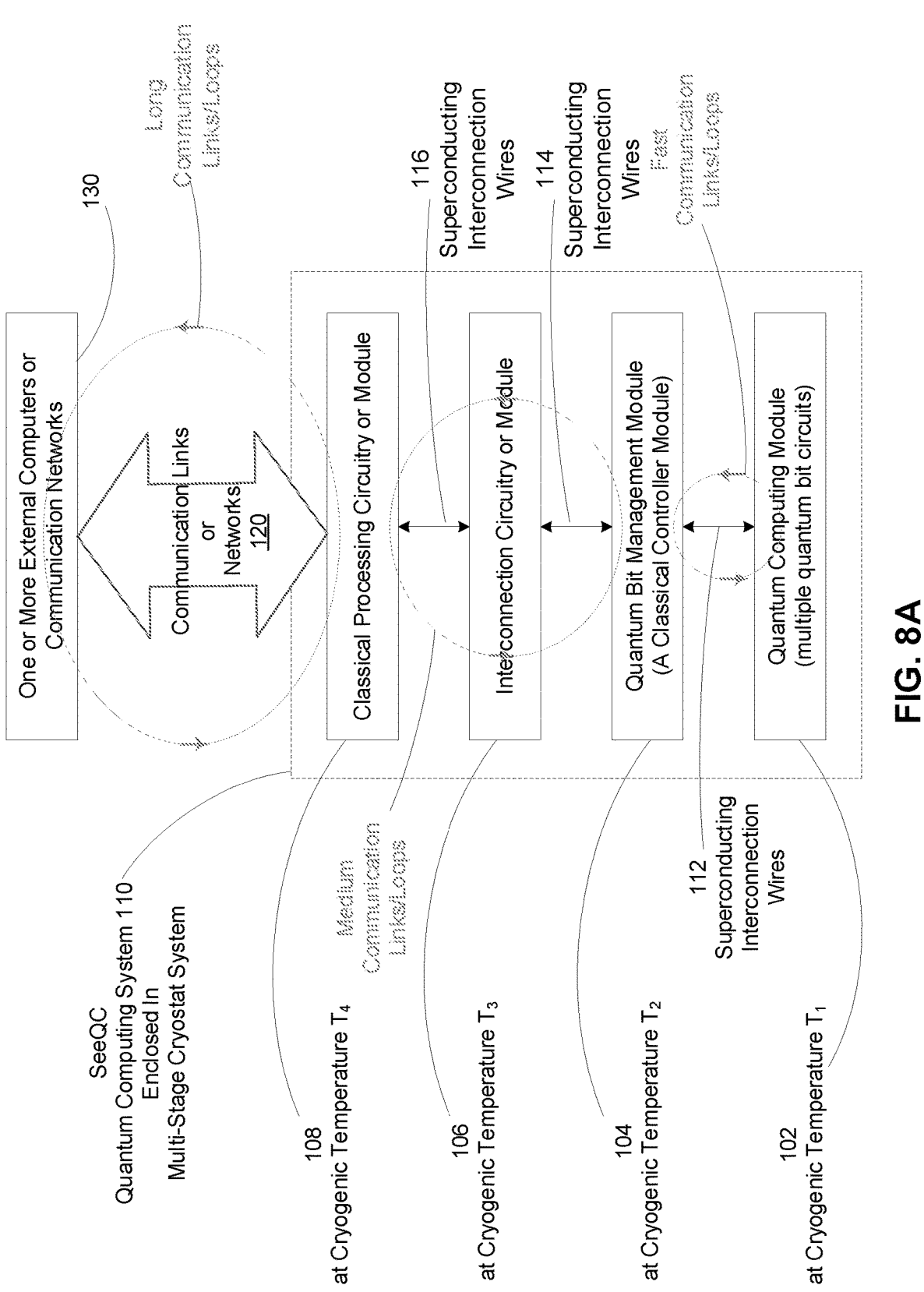
FIGS. 8A, 8B and 8C show examples of quantum computing systems based on the disclosed technology.
Figure 8B:
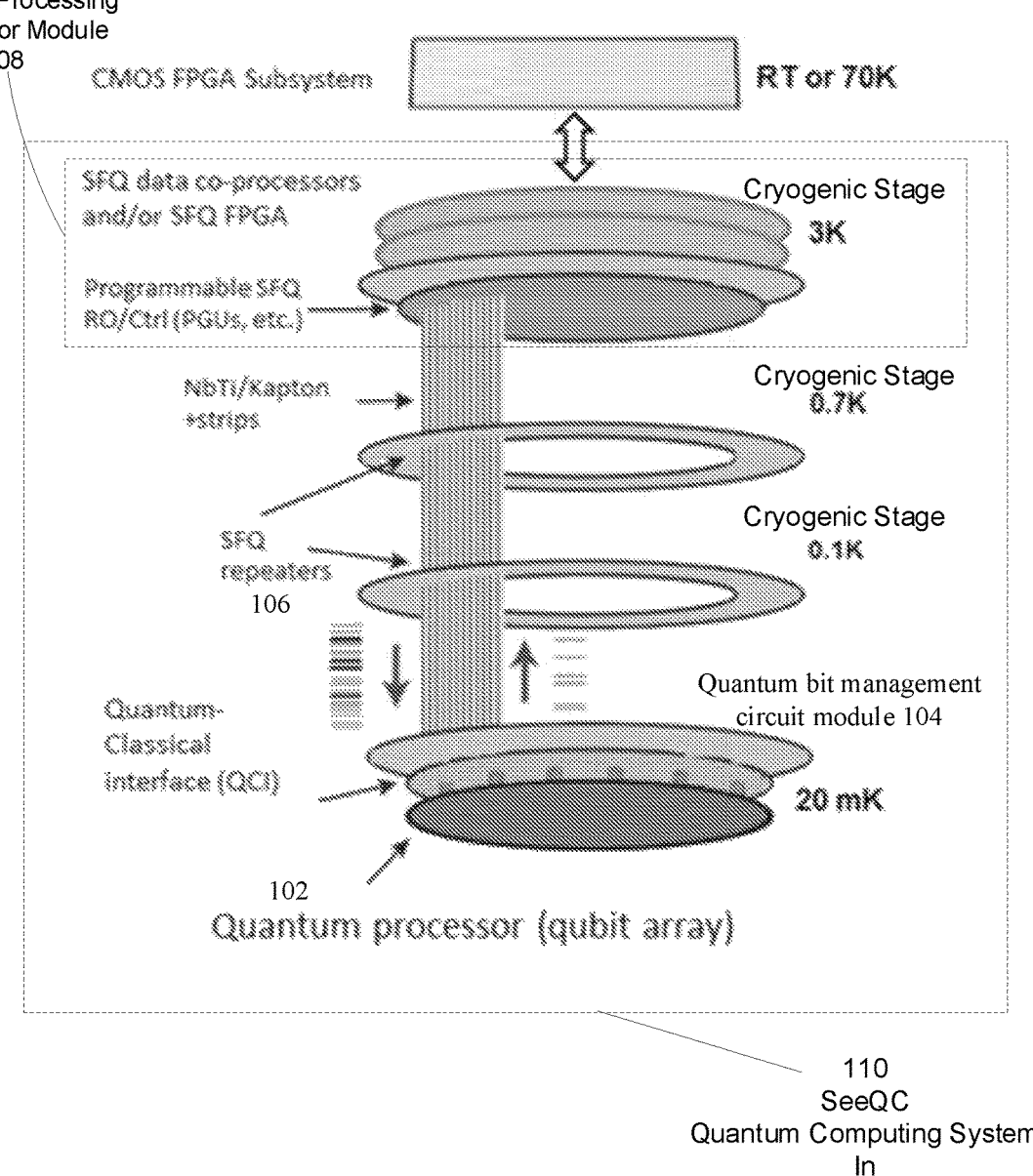
Figure 8C:
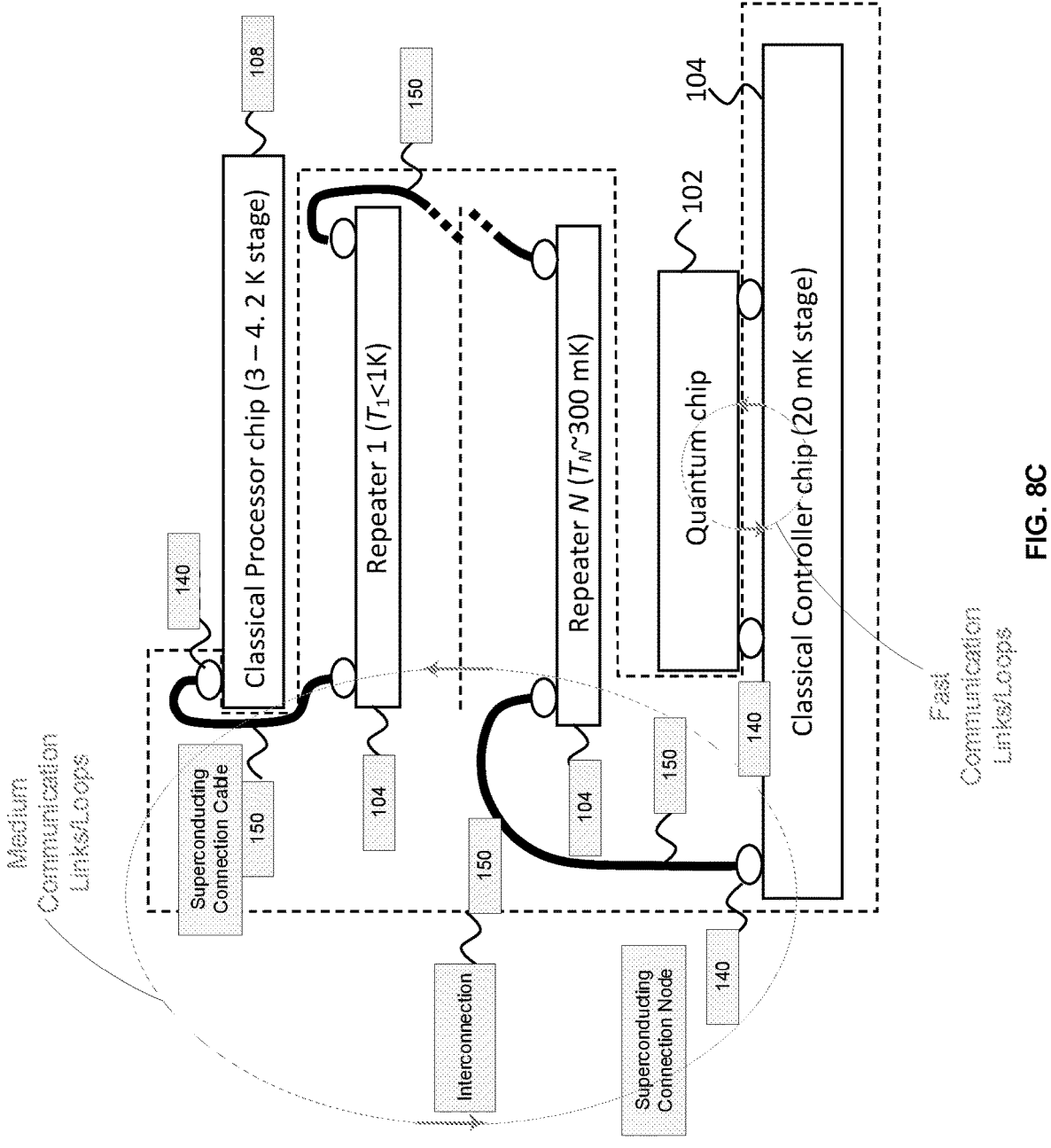

In implementations of bias circuits, the DC current bias caused flux values may be calibrated just once (for having the most symmetrical and harmonic potential shape in the "ready" configuration in FIG. 6C). These calibrating DC flux biases can be generated locally by SFQ superconducting circuitry located on the classical chips (as shown in FIGS. 8A-8C) or potentially by cryoCMOS chips located at 4K stage. The fast flip will still be given by an additional "fast flux line" driven by a SFQ pulses generator.

The above features of quantum computing systems, including the symmetric RF SQUID readout circuit, can be used for implementing computing or information processing systems with superconductor-based quantum computing modules (e.g., superconducting Josephson junctions). Such systems can combine quantum computing modules or devices and classical digital computing modules or devices in ways that allow the systems to be scalable for complex computing applications and by strategically partitioning such systems into different quantum and classical digital computing modules, devices or components at various cryogenic stages at different cryogenic temperatures to achieve superconducting conditions at those cryogenic stages. Such implementations can be used to simplify and reduce the complex and bulky cryogenic systems commonly used in various quantum computer systems using superconducting quantum computing devices and to reduce the use or level of use of complex superconducting cabling systems for linking different computing or processing modules. Implementations of the disclosed technology can be devised to allow for commercially scalable fabrication using IC fabrication processes and equipment in manufacturing key modules or devices for quantum computer systems based on superconducting Josephson junctions.

FIGS. 8A, 8B and 8C show examples of quantum computing systems based on the disclosed technology and interconnection designs for connecting different hardware modules within a multistage cryogenic system.

FIG. 8A shows an example of a quantum computing system 110 to produce scalable hybrid quantum-classical computing systems for commercial applications. The quantum computing system 110, as its name implies, includes multiple qubit circuits and performs computing operations based on quantum states of the qubit circuits and is in communications with external computers or computing systems 130 via the communication links or networks 120. The communication links and networks 120 may include circuits where signals are transferred in the form of electromagnetic signals, including for example, electric signals carried by electrically conductive wires and/or optical signals. In operation, the quantum computing system 110 receives computation requests or tasks from one or more external computers or computing systems 130, performs the requested computation operations and sends the computation results back to the one or more requesting external computers or computing systems 130. The communications and/or interactions between the quantum computing system 110 and external computers or computing systems 130 are via the communication links or networks 120 and may constitute the longest communication cycle in time in the operations of the quantum computing system 110 and is labeled as the long communication links or loops. As further explained below, the quantum computing system 110 is structured to partition different internal computing modules so that those internal computing modules communicate via internal shorter communication links or loops such as medium communication links or loops with medium delays in time and fast communication links or loops with the shortest delays in time.

The quantum computing system 110 includes a multistage cryogenic system to provide different cryogenic stages at different locations and to maintain at different cryogenic temperatures for keeping different modules or devices at their respective desired temperatures (e.g., T1, T2, T3 and T4 as shown). In some implementations, the different cryogenic stages may be designed to produce temperatures from milli Kelvins to tens of Kelvins. This example system 110 includes a quantum computing module 102 that includes multiple qubit circuits or devices as the quantum qubit ensemble to perform desired quantum computing operations via their respective qubit states. In many implementations, the quantum computing module 102 is engaged or coupled to a cryogenic stage at a low cryogenic temperature T1 to ensure that qubit circuits or devices are under the desired superconducting condition and under acceptable quantum computing operating conditions at which the noise level and interference level are sufficiently low.

A quantum bit management circuit module 104 is provided to be in communications with the quantum computing module 102 to provide control signals to the individual qubit circuits or devices of the quantum computing module 102 and to read out the individual qubit circuits or devices and may be implemented by using non-quantum mechanical processing circuitry such as digital circuitry or analogy circuitry or a combination of digital and analog circuitry. In implementations, the symmetric RF SQUID readout circuits and operations explained in FIGS. 2 through 7E can be implemented as part of the quantum bit management circuit module 104.

The quantum bit management circuit module 104 may be implemented with superconducting circuitry and is coupled to a cryogenic stage at a cryogenic temperature T2 which may be different from the low cryogenic temperature T1 in some implementations or be the same as the temperature T1 in other implementations. As further explained below, in some designs, the quantum computing module 102 and quantum bit management circuit module 104 may be engaged to share a common cryogenic stage so that both modules are kept at the same cryogenic temperature. The quantum bit management circuit module 104 can be structured to include (1) quantum bit control circuits to direct control signals to the quantum bit circuits to control the quantum bit circuits, respectively, and (2) quantum bit readout circuits to output readout signals from the quantum bit circuits, respectively. In this example, the quantum computing module 102 and quantum bit management circuit module 104 together form the "heart" or "core" of the quantum computing system 110 in part because the quantum computing operations are performed within the quantum computing module 102 based on the control signals to qubit circuits from the quantum bit management circuit module 104 and the readouts of the qubit circuits are performed by the quantum bit management circuit module 104. The communications between the quantum computing module 102 and quantum bit management circuit module 104 are essential to the quantum computing operations in terms of the quality and speed of such communications. Accordingly, in implementations, the quantum computing module 102 and quantum bit management circuit module 104 can be placed or positioned physically close to or adjacent to each other to shorten signal paths between the two modules 102 and 104 and to reduce any interference or noise to such communications. In addition, the functions or operations of the quantum bit management circuit module 104 may, by an intentional design, be limited to certain core functions or operations in connection with the quantum computations performed by the quantum computing module 102 so that the quantum bit management circuit module 104 can achieve a short or fast response or processing time to ensure fast input/output signaling at the quantum computing module 102. This intentional reduced function design consideration for the quantum bit management circuit module 104 is also based on the desire to reduce the power consumption and energy dissipation by the quantum bit management circuit module 104 to its surroundings in light of its close proximity to the quantum computing module 102, the noise or interference by the quantum bit management circuit module 104 to the quantum computing module 102 and the need for maintaining proper cryogenic conditions at the both the quantum bit management circuit module 104 and the adjacent quantum computing module 102. Based on the above and other considerations, the interconnections and signal paths between the two modules 102 and 104 are designed to form the fast communication link or loop with the shortest delay in time for the quantum computing system 110. For example, in some implementations, the quantum computing module 102 may include at least one integrated chip supporting one or plurality of quantum bit circuits and the quantum bit management circuit module 104 may be formed on another integrated chip which is directly coupled to the integrated chip with the quantum bit circuits, mechanically and electrically, as a multichip module via superconducting bumps, capacitive coupling, or magnetic coupling via vacuum to transfer control signals and readout signals therebetween. This multichip module formed by the two modules 102 and 104 can be coupled to the same cryogenic stage at the low cryogenic temperature T1. This design can be commercially important because the chip fabrication for the multichip module formed by the two modules 102 and 104 is a scalable platform to allow a wide range of quantum bit circuits to be fabricated and included in the quantum computing module 102 and, similarly, the quantum bit management circuit module 104 may also be scaled based on the number of quantum bit circuits present.

The quantum computing system 110 in FIG. 8A further includes a digital processing module 106 that provides certain signal and data processing functions or operations for the quantum computing system 110 in connection with quantum computations performed by the quantum computing module 102 via the quantum bit management circuit module 104. In this regard, the digital processing module 108 forms the core processing module for non-quantum computation and/or processing functions within the quantum computing system 110 and thus is designed with much more complex circuitry and higher processing capabilities than the quantum bit management circuit module 104. Specifically, certain functions and/or processing operations that cannot be built into the quantum bit management circuit module 104 may be included in the circuitry of the digital processing module 108. In addition, the digital processing module 108 also functions as an interface between the quantum computing system 110 and one or more external computers or computing systems 130 via the communication links or networks 120. As such, the digital processing module 108 is designed to further include processing functions associated with communications and interactions between the quantum computing system 110 and external computers or computing systems 130. Therefore, different from the placement and design of the quantum bit management circuit module 104, the digital processing module 108 is designed to be a complex and capable classical counterpart and co-processor of the quantum computing module 102 of the quantum computing system 110. The increased functions and/or processing operations and processing capabilities packed into the digital processing module 108 add to the complexity and size of the circuitry of the digital processing module 108 and further increase the power consumption and energy dissipation of the digital processing module 108. Therefore, it is desirable to place the digital processing module 108 physically away from the quantum computing module 102 and its adjacent neighbor quantum bit management circuit module 104 to reduce the noise and interference that the digital processing module 108 may impose onto the quantum computing module 102. The digital processing module 108 may be designed with various functions and capabilities, including, e.g., error correction functions for the quantum computing system 110, and non-quantum computation and/or processing functions within the quantum computing system 110, including, e.g., functions in connection with the control of and readout of the quantum computing module 102 performed by the quantum bit management circuit module 104, and management of data of the quantum computations performed by the quantum computing module 102. In some implementations, the digital processing module 106 may be coupled to a cryogenic stage at a temperature T4 higher than those for the quantum computing module 102 (at T1) and quantum bit management circuit module 104 (at T2). The digital processing module 108 may be designed to include superconducting circuitry and is enclosed within the multi-stage cryogenic system of the quantum computing system 110.

The intentional design for placing the digital processing module 108 away from the quantum bit management circuit module 104 leads to longer signal paths or links between the digital processing module 108 and the quantum bit management circuit module 104. Within the enclosure of the multi-stage cryogenic system, such signal paths or links may be formed by using superconducting wires or cables. Notably, the long lengths of such signal paths or links may cause a certain degree of signal degradation and one option for addressing this is to add one or more interconnection repeaters or signal conditioning circuits 106 between the digital processing module 108 and the quantum bit management circuit module 104 to condition the signals. Like other modules within the multi-stage cryogenic system, each interconnection repeater or signal conditioning circuit 106 may be engaged or coupled to a cryogenic stage at a temperature T3 higher than the temperature of the quantum bit management circuit module 104 (at T1 or T2) and lower than the temperature of the digital processing module 108 (at T4). For example, a digital signal conditioning circuit module 106 may include a superconducting circuit which conditions the control signals or the readout signals.

The combination of placing the digital processing module 108 away from the quantum bit management circuit module 104 and the complex circuitry and processing operations in the digital processing module 108 leads to a longer time or delay in the internal communication links or loops between the digital processing module 108 and the quantum bit management circuit module 104. As labeled in FIG. 8A, such internal communication links or loops between the digital processing module 108 and the quantum bit management circuit module 104 form medium communication links or loops with a medium delay in time longer than the delay in the fast communication links or loops between the quantum bit management circuit module 104 and the quantum computing module 102 and shorter than the delay in the long communication links or loops between the digital processing module 108 and external computers or computing systems 130 via the communication links or networks 120.

Therefore, the example of the quantum computing system 110 in FIG. 8A includes special design features to provide a hybrid computing environment that combines processing functions and/or operations by the quantum computing part (e.g., the quantum computing module 102) and non-quantum classical processing part (e.g., the quantum bit management circuit module 104 and the digital processing module 108) and to strategically partition and allocate different amounts and types of processing functions and/or operations of the non-quantum classical processing part between the quantum bit management circuit module 104 and the digital processing module 108 in light of the intentional design for placing the quantum bit management circuit module 104 physically close to the quantum computing module 102 while distancing the quantum computing module 102 from the digital processing module 108.

In various implementations, the quantum computing module 102 and non-quantum classical processing part (e.g., the quantum bit management circuit module 104 and the digital processing module 108) are structured to include superconducting circuits or devices coupled to different cryogenic stages of the multistage cryogenic system and superconducting interconnection wires 112, 114 and 116 are provided and maintained at temperatures at different locations to transfer signals between different modules or stages. The multi-stage cryogenic system for the quantum computing system 110 may be implemented in various configurations including multi-stage dilution refrigerators designed based on mixing of helium-3 and helium-4 to provide the different cryogenic stages at the different graded cryogenic temperatures. In some implementations, the cryostat system may include a nuclear demagnetization refrigerator or adiabatic demagnetization refrigerator.

The modules within the quantum computing system 110 may be implemented in various configurations. For example, each quantum bit circuit for the qubits in the quantum computing module 102 may include a superconducting Josephson junction circuit or a switching superconducting circuit different from a Josephson junction circuit. For example, the quantum bit management circuit module 104 may be implemented to include a superconducting Josephson junction circuit or single flux quantum (SFQ) logic circuit, or a quantum flux parametron circuit such as an adiabatic quantum flux parametron circuit, or a nanowire switch, or a superconducting ferromagnetic transistor, or a superconducting spintronic device, or a field-effect superconducting device. The digital processing module 108 may be implemented to include SFQ circuitry, field-programmable gate arrays (FPGAs), or one or more application specific integrated circuits (ASICs).

In some implementations, the quantum computing system 110 may further include a digital processing subsystem outside the multistage cryogenic system or the cryostat system to communicate with the digital processing module 108 to perform an operation associated with supporting execution of quantum or quantum-classical algorithms and/or communication with one or more other computers or networks 130. This digital processing subsystem outside the cryostat system may include one or more CMOS digital processors, one or more field-programmable gate arrays (FPGAs), or one or more application specific integrated circuits (ASICs), or one or more central processing units (CPUs).

In the system in FIG. 8A, optical communication links may be used for transfer of signals, either as a replacement for certain electrically conductive wires or cables or as additional links in combination with electrically conductive wires or cables. An optical communication link can provide faster data transmission and increase the communication bandwidth. For example, optical communication can be used between the cryogenic stage with the highest temperature stage (e.g., the module 108 in FIG. 8A) and a room temperature stage. In implementations, optical transmitter and receiver devices are provided in such stages or circuit modules to enable transmission and reception of optical signals between the cryogenic stages situated at the highest temperature of the cryostat system and the room temperature electronics to provide communications therebetween. In FIG. 1B, such optical communication links may be implemented between the module 108 and the CMOS FPGA subsystem.

FIG. 8B shows an example of a quantum computing system that is capable of information processing based at least in part on quantum computing using quantum states of quantum bits using the design in FIG. 8A. The cryostat system in this example is structured and operable to provide different cryogenic stages at different temperatures at 20 mK, 0.1K, 0.7K, and 3K. Different circuit modules at the different cryogenic stages are interconnected by superconducting wires such as NbTi/Kapton strips. The quantum computing module enclosed by the cryostat system includes a first integrated chip structured to support quantum bit circuits. Each quantum bit circuit is structured as a superconducting circuit to exhibit different quantum states as a quantum bit and to quantum mechanically interact with other quantum bit circuits via quantum entanglement to cause superposition or correlation of different quantum states of the quantum bit circuits. The quantum bit management circuit module is located adjacent to the quantum computing module and is coupled to be maintained at the same low cryogenic temperature as with the quantum computing module. The quantum bit management circuit includes a second integrated chip, quantum bit control circuits supported by the second integrated chip and structured to direct control signals to the quantum bit circuits to control the quantum bit circuits, respectively, and quantum bit readout circuits supported by the second integrated chip and structured to output readout signals from the quantum bit circuits, respectively. In operation, the readout signals represent quantum states of the quantum bit circuits, respectively, the quantum bit control circuits and quantum bit readout circuits are structured to include superconducting circuits and operable to operate with the control signals and readout signals based on digital processing and in a non-quantum classical manner. Notably, the second integrated chip is engaged to the first integrated chip to form a multichip module transfer control signals and readout signals.

FIG. 8C shows an example for interconnections that link different hardware components of classical and quantum circuits. The system includes at least one classical non-quantum digital processing module 108 labeled as "Classical Processor Chip," at least one SFQ repeater as part of the interconnection circuitry or module 104, at least one classical superconducting controller as part of the quantum bit management circuit module 104, which controls the quantum computing processor or module 102 with multiple qubit circuits or devices.

The interconnections are designed to superconducting connection nodes or pads 140 and superconducting connection cables 150 for connecting the classical circuits 104, 106 and 108 and the quantum computing processor or module 102. As illustrated, superconducting connection nodes or pads 140 may be implemented as superconducting bumps in direct contact with one or more hardware components (102, 104, 106, 108) to be connected and can be used to provide connection between a hardware component and a superconducting cable. As explained with reference to FIG. 7A, the quantum computing module 102 and the quantum bit management circuit module 104 can be placed adjacent to each other to allow short connection paths between them for fast inter-module communications and can be thermally coupled to the same cryogenic stage at the same low cryogenic temperature. Notably, the communication links or loops between the classical superconducting controller as part of the quantum bit management circuit module 104 and the quantum processor chip 102 should be fast communication links or loops and superconducting bumps can be used for interconnecting the two modules 102 and 104 to enable fast exchange of information for quantum computing operations and readout. In some implementations, the quantum bit management circuit module 104 containing the classical controller chip can be positioned on the cold plate of a cryocooler immediately below the quantum computing module 102 to reduce noise and interference to the quantum computing operations by the qubit circuits or devices inside the quantum computing module 102. In some implementations, superconducting bumps can be configured or used in the form of fences or walls which produce compartments separating strip or microstrip lines or other on-chip transmission lines, as well as qubits or systems of multiple qubits from each other, in order to reduce the mutual crosstalk between the superconducting electronic elements or systems and to improve the quality factors of resonators.

In addition to direct electrical connections between the quantum computing module 102 and the quantum bit management circuit module 104, non-contact connections may be used to achieve the fast communications, including, for example, the differential capacitive coupling between the qubits and the passive transmission lines and magnetic coupling, both of which provide communication links without direct connections and allow for compensation of the geometric misalignments between the modules 102 and 104 and other components as a result of the fabrication process.

The quantum computing operations by the qubit circuits or devices inside the quantum computing module 102 are different from a classical computer based on a deterministic Turing machine and Boolean bits of "0" and "1" states and use quantum-mechanical phenomena such as superposition of "0" and "1" states, entanglement between qubits, and interference between probability amplitudes of non-deterministic measurement outcomes to perform computing operations. Superconducting qubits inside the quantum computing module 102 can be implemented by superconducting Josephson junctions. A Josephson junction is a system consisting of weakly coupled superconductors exhibiting correlated, or coherent, state and behaves like a non-linear inductor which allows for building a quantum anharmonic oscillator. The two discrete energy level states of this anharmonic oscillator and their quantum superposition are used to create a qubit. Using Josephson junctions, several versions of superconducting qubits can be constructed, such as transmon, xmon, quantronim, fluxonium, C-shunted flux qubits, etc.

As explained above, the state of a qubit is controlled by applying a microwave signal or by a digital SFQ pulse sequence. Typically, the microwave signal generators are room-temperature devices, whereas the quantum circuits comprising qubits operate at very low cryogenic temperatures in order to reduce undesired decoherence of qubits. However, the wiring needed to provide the microwave signal and running from the room temperature to the cold stage where a quantum circuit is situated, causes electric noise, excessive heat load, and occupies a lot of space, which leads to decoherence and poses a significant problem for scaling up the quantum computer. In order to overcome this problem, various techniques may be used to control the qubits in a fully integrated, cryogenic, hybrid quantum-classical processor as shown in FIGS. 14A-14C, including, for example, integration of superconducting qubits with classical superconducting digital logic families such as reciprocal-quantum-logic (RQL) as disclosed by Quentin P. Herr and Anna Y. Herr in "Ultra-low-power superconductor logic," J. Appl. Phys. 109, 103903 (2011), use of adiabatic quantum-flux-parametrons (AQFP) by O. Chen, R. Cai, Y. Wang, F. Ke, T. Yamae, R. Saito, N. Takeuchi, and N. Yoshikawa in "Adiabatic Quantum-Flux-Parametron: Towards Building Extremely Energy-Efficient Circuits and Systems," Sci. Rep. 9, 10514 (2019), or the use of energy-efficient single-flux quantum (SFQ) technologies including eSFQ and ERSFQ by O. A. Mukhanov in "Energy-Efficient Single Flux Quantum Technology," IEEE Trans. Appl. Supercond. 21, 760 (2011). As part of the interconnection design for the systems in FIGS. 14A-14C, the control of qubits can be implemented via a SFQ system to control the state of a qubit by applying a sequence of the SFQ pulses without the conventional use of microwave signals as disclosed in U.S. Pat. No. 9,425,804. Techniques for applying flux to a quantum-coherent superconducting circuit in the U.S. Patent Application Publication No. US 2015/0263736A1 may also be implemented. The readout of qubits may be implemented by quantum electrodynamic s measurements disclosed in U.S. Pat. No. 9,692,423. Cryogenic CMOS (cryoCMOS) techniques may also be used to implemented in the systems in FIGS. 7A-7C including, e.g., controlling superconducting qubits. See E. Charbon, F. Sebastiano, A. Vladimirescu, H. Homulle, S. Visser, L. Song, and R. M. Incandela. "Cryo-CMOS for quantum computing", Technical Digest —International Electron Devices Meeting, IEDM (2017), pp. 1-13. doi: and J. C. Bardin, E. Jeffrey, E. Lucero, T. Huang, O. Naaman, R. Barends, T. White, M. Giustina, D. Sank, P. Roushan, K. Arya, B. Chiaro, J. Kelly, J. Chen, B. Burkett, Y. Chen, A. Dunsworth, A. Fowler, B. Foxen, C. Gidney, R. Graff, P. Klimov, J. Mutus, M. McEwen, A. Megrant, M. Neeley, C. Neill, C. Quintana, A. Vainsencher, H. Neven, and J. Martinis. "A 28 nm Bulk-CMOS 4-to-8 GHz 2 mW Cryogenic Pulse Modulator for Scalable Quantum Computing", IEEE J. Solid-St. Circuits 54, 3043-3060 (2019).

Practical implementations of the systems in FIGS. 8A-8C require careful designs for the interconnections or interface between the quantum device situated at millikelvin temperature and classical processing circuit situated at liquid helium temperature. The interconnections in the example in FIG. 8C include placing the quantum computing module 102 and the quantum bit management circuit module 104 next to each other on the same cryogenic stage of the dilution refrigerator without using any superconducting cables or wires 150 between the modules 102 and 104. Instead, superconducting bumps or pads 140 are used to physically join or bind the two modules 102 and 104 together. The signal paths between the two modules 102 and 104 can be implemented in various ways, include signaling via conductive paths formed though the superconducting bumps or pads 140 between the modules 102 and 104, or signaling via capacitive and/or magnetic coupling between the modules 102 and 104. The signal paths between the two modules 102 and 104 are designed to minimize the signal transmission time (e.g., by reducing or eliminating the amount wiring between the modules 102 and 104) and to form the fast communication links or loops in the system as explained above with respect to FIG. 8A.

In implementations where the two modules 102 and 104 are supported by two IC chips and two chips may be stacked over each other and bonded to form a multichip module (MCM) which is, as an integrated unit, coupled to the same low temperature cryogenic stage so both modules 102 and 104 are operated under the same low cryogenic temperature. Superconducting bumps or pads 140 may be used as part of the binding of the two IC chips. The interconnections in the example in FIG. 8C also implements combinations of superconducting bumps or pads 140 and superconducting cables or wires 150 where the superconducting bumps or pads 140 are used at terminals of the superconducting cables or wires 150 for connecting the wire terminals to devices. For example, in FIG. 8C, the quantum bit management circuit module 104 in FIG. 8C is shown to be connected to an interconnection circuitry or module 106 such as a digital signal conditioning circuit module via superconducting cables or wires 150 where two sets of superconducting bumps or pads 140 are used to join the two end terminals of each superconducting cable or wire 150 to the contacting points on the quantum bit management circuit module 104 and the corresponding interconnection circuitry or module 106. This use of superconducting bumps or pads 140 and superconducting cables or wires 150 can be applied to connections for other modules such as the connection between the digital processing module 108 and a corresponding interconnection circuitry or module 106 and a connection between different stages or digital signal conditioning circuit modules of the interconnection circuitry or module 106. As illustrated such superconducting cables or wires 150 with superconducting bumps or pads 140 constitute part of the medium communication links and loops as explained above with respect to FIG. 8A.

The above examples for disclosed quantum computing systems provide unique interconnection designs for different modules to allow practical and scalable implementations based on new system designs and new interconnection designs by reducing complex wiring with a large number of wiring running from room temperature to the cold stage where the quantum chip is situated. The disclosed system designs and interconnections would allow quantum computing systems to be scaled with different quantum computing power for different applications. In implementations, qubit control can be implemented by SFQ control and by placing the SFQ control chip in close proximity to the quantum circuit chip with suitable interconnections operating different cryogenic temperatures, e.g., from liquid He temperatures for classical non-quantum processing circuits or modules and to millikelvin temperatures for qubits of one or more quantum circuits or processors.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Only a few implementations and examples are described and other implementations, enhancements and variations can be made based on what is described and illustrated in this patent document.

What is claimed is what is described and illustrated, including:

1. A system capable of information processing based at least in part on quantum computing using quantum states of quantum bits, comprising:

a cryostat system structured to include different cryogenic stages operable to provide a low cryogenic temperature and higher cryogenic temperatures;

a quantum computing module enclosed by the cryostat system at the low cryogenic temperature, the quantum computing module comprising a first integrated chip structured to support a plurality of quantum bit circuits, wherein each quantum bit circuit is structured as a superconducting circuit at the low cryogenic temperature to exhibit different quantum states as a quantum-mechanical system and to quantum-mechanically interact with other quantum bit circuits via quantum entanglement to cause superposition or correlation of different quantum states of the quantum bit circuits;

a quantum bit management circuit module enclosed by the cryostat system, located adjacent to the quantum computing module and coupled to be maintained at a cryogenic temperature, quantum bit control circuits supported by the second integrated chip and structured to direct control signals to the quantum bit circuits to control the quantum bit circuits, respectively, and quantum bit readout circuits supported by the second integrated chip and structured to output readout signals from the quantum bit circuits, respectively, the readout signals representing quantum states of the quantum bit circuits, respectively, the quantum bit control circuits and quantum bit readout circuits structured to include superconducting circuits at the low cryogenic temperature and operable to operate with the control signals and readout signals based on digital processing and in a non-quantum classical manner, and wherein the second integrated chip is engaged to the first integrated chip to form a multichip module to transfer control signals and readout signals therebetween, wherein each quantum bit readout circuit includes (1) an inductor, (2) two radio frequency (RF) superconducting quantum interference device (SQUID) circuits coupled to the inductor to form a phase sensitive detector that is operable to measure a phase of a signal, and (3) a bias circuit coupled to the two RF SQUID circuits to bias either one or both of the two RF SQUID circuits to reduce a difference in currents in the two RF SQUID circuits;

circuit modules enclosed by the cryostat system at the higher cryogenic temperatures and structured to communicate with the quantum bit management circuit module in connection with the control signals and readout signals;

electrically conductive bumps formed to connect the first and second integrated chips, or a capacitive coupling, or a magnetic coupling, to form at least part of communications between the quantum bit management circuit module and quantum computing module for transfer of part of the control signals and readout signals; and electrically conductive wires coupled between the quantum bit management circuit module and at least one of the circuit modules situated at higher temperature stages of the cryostat system to provide communications and transfer signals therebetween.

2. The system as in claim 1, wherein the bias circuit is structured to produce two bias fluxes in the two RF SQUID circuits, respectively, to reduce the difference in critical currents in the two RF SQUID circuits.

3. The system as in claim 1, wherein the bias circuit is structured to cause a bias current to be generated in at least one of the two RF SQUID circuits to reduce a difference in currents in the two RF SQUID circuits to maintain a symmetry between the two RF SQUID circuits.

4. The system as in claim 1, wherein the quantum bit management circuit module and the quantum computing module are maintained at the same low cryogenic temperature.

5. The system as in claim 1, wherein each quantum bit readout circuit is instructed to generate a read signal at a signal frequency between resonant frequencies associated with excited and ground states of a corresponding quantum bit circuit, respectively, and to detect a phase of a reflected signal of the read signal from the corresponding quantum bit circuit to indicate a quantum state of the corresponding quantum bit circuit based on the detected phase.

*    *    *    *    *